(12) United States Patent
Faulkner et al.

(10) Patent No.: US 7,383,381 B1
(45) Date of Patent: Jun. 3, 2008

(54) SYSTEMS AND METHODS FOR CONFIGURING A STORAGE VIRTUALIZATION ENVIRONMENT

(75) Inventors: Kevin Faulkner, Westford, MA (US); Wai Yim, Merrimack, NH (US); Rod DeKoning, Augusta, KS (US); David Kopper, Wichita, KS (US)

(73) Assignee: Sun Microsystems, Inc., Menlo Park, CA (US)

( * ) Notice: Subject to any disclaimer, the term of this patent is extended or adjusted under 35 U.S.C. 154(b) by 559 days.

(21) Appl. No.: 10/787,324

(22) Filed: Feb. 27, 2004

Related U.S. Application Data

(60) Provisional application No. 60/451,054, filed on Feb. 28, 2003.

(51) Int. Cl.
*G06F 13/10* (2006.01)
(52) U.S. Cl. ..................................... 711/114
(58) Field of Classification Search .......... 711/114; 709/226, 229
See application file for complete search history.

(56) References Cited

U.S. PATENT DOCUMENTS

| | | |
|---|---|---|
| 4,607,365 A | 8/1986 | Greig et al. |
| 5,140,592 A | 8/1992 | Idleman et al. |
| 5,504,882 A | 4/1996 | Chai et al. |
| 5,533,190 A | 7/1996 | Binford et al. |
| 5,535,381 A | 7/1996 | Kopper |
| 5,539,875 A | 7/1996 | Bishop et al. |
| 5,588,110 A | 12/1996 | DeKoning et al. |
| 5,634,033 A | 5/1997 | Stewart et al. |
| 5,671,365 A | 9/1997 | Binford et al. |
| 5,742,752 A | 4/1998 | DeKoning |

(Continued)

FOREIGN PATENT DOCUMENTS

WO   WO 83/01334   4/1983

(Continued)

OTHER PUBLICATIONS

Kim, Yongdae, et al., "Secure Group Services for Storage Area Networks", 2002, pp. 1-14.

*Primary Examiner*—Kevin L. Ellis
(74) *Attorney, Agent, or Firm*—Finnegan, Henderson, Farabow, Garrett & Dunner, LLP

(57) ABSTRACT

A storage virtualization environment is provided that includes a network switch system for initializing a virtual volume in a system including a host system, and storage devices. The network switch system includes storage processors including first and second tier storage processors and a Virtualization Coherency Manager (VCM) for receiving storage connectivity identifying which storage processors are connected to selected ones of the storage devices. Further, the network switch system includes a master storage processor for creating a logical tree based on the storage connectivity information, the logical tree reflecting a virtual volume of data distributed across the storage devices and includes (i) first tier objects representing partitions of the virtual volume data and (ii) second tier objects representing a logical configuration of the virtual volume. In one embodiment, the VCM assigns the first tier objects to selective ones of the first tier storage processors and assigns the second tier objects to selective ones of the second tier storage processors based on the logical tree. Further, each of the selective first and second tier storage processors initialize a local portion of the virtual volume to allow the host system to access the virtual volume through the network switch system.

37 Claims, 22 Drawing Sheets

U.S. PATENT DOCUMENTS

| | | | |
|---|---|---|---|
| 5,754,557 | A | 5/1998 | Andrewartha |
| 5,761,705 | A | 6/1998 | DeKoning et al. |
| 5,778,426 | A | 7/1998 | DeKoning et al. |
| 5,787,242 | A | 7/1998 | DeKoning et al. |
| 5,790,773 | A | 8/1998 | DeKoning et al. |
| 5,790,775 | A | 8/1998 | Marks et al. |
| 5,860,091 | A | 1/1999 | DeKoning et al. |
| 5,875,343 | A | 2/1999 | Binford et al. |
| 5,883,909 | A | 3/1999 | DeKoning et al. |
| 5,917,723 | A | 6/1999 | Binford |
| 5,933,824 | A | 8/1999 | DeKoning et al. |
| 5,941,994 | A | 8/1999 | DeKoning et al. |
| 5,974,502 | A | 10/1999 | DeKoning et al. |
| 5,975,738 | A | 11/1999 | DeKoning et al. |
| 6,009,275 | A | 12/1999 | DeKoning et al. |
| 6,055,228 | A | 4/2000 | DeKoning et al. |
| 6,067,635 | A | 5/2000 | DeKoning et al. |
| 6,073,218 | A | 6/2000 | DeKoning et al. |
| 6,085,333 | A | 7/2000 | DeKoning et al. |
| 6,092,216 | A | 7/2000 | Kobayashi et al. |
| 6,108,684 | A | 8/2000 | DeKoning et al. |
| 6,148,368 | A | 11/2000 | DeKoning |
| 6,173,293 | B1 | 1/2001 | Thekkath et al. |
| 6,173,374 | B1 | 1/2001 | Heil et al. |
| 6,178,520 | B1 | 1/2001 | DeKoning et al. |
| 6,216,199 | B1 | 4/2001 | DeKoning et al. |
| 6,275,898 | B1 | 8/2001 | DeKoning |
| 6,304,942 | B1 | 10/2001 | DeKoning |
| 6,334,195 | B1 | 12/2001 | DeKoning et al. |
| 6,356,969 | B1 | 3/2002 | DeKoning et al. |
| 6,366,965 | B1 | 4/2002 | Binford et al. |
| 6,381,674 | B2 | 4/2002 | DeKoning et al. |
| 6,384,842 | B1 | 5/2002 | DeKoning et al. |
| 6,385,683 | B1 | 5/2002 | DeKoning et al. |
| 6,412,045 | B1 | 6/2002 | DeKoning et al. |
| 6,457,098 | B1 | 9/2002 | DeKoning et al. |
| 6,467,023 | B1 | 10/2002 | DeKoning et al. |
| 6,480,901 | B1 | 11/2002 | Weber et al. |
| 6,480,955 | B1 | 11/2002 | DeKoning et al. |
| 6,480,970 | B1 | 11/2002 | DeKoning et al. |
| 6,529,989 | B1 | 3/2003 | Bashford et al. |
| 6,553,511 | B1 | 4/2003 | DeKoning et al. |
| 6,567,889 | B1 | 5/2003 | DeKoning et al. |
| 6,584,499 | B1 | 6/2003 | Jantz et al. |
| 6,591,337 | B1 | 7/2003 | DeKoning et al. |
| 6,594,744 | B1 | 7/2003 | Humlicek et al. |
| 6,622,259 | B1 | 9/2003 | Schmuck |
| 6,675,316 | B1 | 1/2004 | Harper |
| 6,836,821 | B2 | 12/2004 | Moore et al. |
| 6,948,044 | B1 | 9/2005 | Chandrasekaran |
| 6,961,838 | B2 | 11/2005 | Reuter et al. |
| 6,981,114 | B1 | 12/2005 | Wu et al. |
| 7,003,687 | B2 | 2/2006 | Matsunami et al. |
| 7,010,663 | B2 | 3/2006 | George et al. |
| 7,013,379 | B1 | 3/2006 | Testardi |
| 7,107,395 | B1 | 9/2006 | Ofek et al. |
| 7,111,189 | B1 | 9/2006 | Sicola et al. |
| 7,165,160 | B2 | 1/2007 | Kodama |
| 7,236,987 | B1 | 6/2007 | Faulkner et al. |
| 2001/0002480 | A1 | 5/2001 | DeKoning et al. |
| 2002/0019920 | A1 | 2/2002 | Reuter et al. |
| 2002/0073175 | A1 | 6/2002 | DeKonning et al. |
| 2002/0184360 | A1 | 12/2002 | Weber et al. |
| 2003/0097611 | A1 | 5/2003 | Delaney et al. |
| 2003/0191911 | A1 | 10/2003 | Kleinschnitz et al. |
| 2003/0200390 | A1 | 10/2003 | Moore et al. |
| 2004/0148380 | A1 | 7/2004 | Meyer et al. |
| 2004/0233910 | A1 | 11/2004 | Chen et al. |
| 2005/0050240 | A1 | 3/2005 | Wilkins et al. |
| 2005/0108375 | A1 | 5/2005 | Hallak-Stamler |
| 2006/0123210 | A1 | 6/2006 | Pritchett et al. |

FOREIGN PATENT DOCUMENTS

| | | | |
|---|---|---|---|
| WO | WO 02/37300 | A1 | 5/2002 |
| WO | WO 02/069166 | A1 | 9/2002 |

…

SYSTEMS AND METHODS FOR CONFIGURING A STORAGE VIRTUALIZATION ENVIRONMENT

RELATED APPLICATIONS

This application claims priority of U.S. Provisional Application No. 60/451,054 filed Feb. 28, 2003, which is hereby incorporated by reference in its entirety. Further, this application is related to U.S. patent application Ser. No. 10/787,320, entitled "SYSTEMS AND METHODS FOR PROVIDING SNAPSHOT CAPABILITIES IN A STORAGE VIRTUALIZATION ENVIRONMENT," and filed concurrently herewith, U.S. patent application Ser. No. 10/787,322, entitled "SYSTEMS AND METHODS FOR DYNAMICALLY UPDATING STATE INFORMATION IN A STORAGE VIRTUALIZATION ENVIRONMENT," and filed concurrently herewith, U.S. patent application Ser. No. 10/787,321, entitled "SYSTEMS AND METHODS FOR PERFORMING QUIESCENCE IN A STORAGE VIRTUALIZATION ENVIRONMENT," and filed concurrently herewith, and U.S. patent application Ser. No. 10/787,323, entitled "SYSTEMS AND METHODS FOR PROVIDING A MULTI-PATH NETWORK SWITCH SYSTEM," and filed concurrently herewith, all of which are hereby incorporated by reference in their entirety.

FIELD OF THE INVENTION

This invention relates to network storage systems and, more particularly, to methods and systems for configuring storage virtualization environments.

BACKGROUND OF THE INVENTION

As networks and distributed systems continue to evolve, new technologies are developed that enable businesses to expand their operations to a global market. As these businesses grow, the need for additional resources also grows. To address these concerns, businesses seek help from Data Center Managers (DCMs) that offer distributed and secure storage services to customers.

Conventional DCM configurations may use fibre channel switches for accessing storage systems dedicated to individual customers. Such configurations enable an DCM to control access to the information stored in the storage systems, thus protecting proprietary information from being accessed by unauthorized users (e.g., other DCM customers). Dedicating storage systems to individual customers, however, is costly.

Another drawback of conventional DCM configurations is the maintenance and service of the disk arrays that make up the dedicated storage systems. In certain instances, DCMs provide storage services by renting storage space from disk array vendors. These vendors typically require the DCM, or customer, to contact them when requesting certain configuration changes, such as adding storage space or reconfiguring data mappings. These problems are intensified when a business includes several departments that use dedicated storage systems provided by an DCM or multiple DCMs. In these instances, departments that manage their own storage systems, via their DCM, sometimes require additional information technology staff and expenditures. Further, such heterogeneous storage system practices may also result in problems in sharing resources between different departments.

SUMMARY OF THE INVENTION

Methods and systems consistent with certain embodiments of the present invention provide a solution that improves the scalability, security, availability, and/or manageability of storage systems. These methods and systems can utilize a single storage switch and allow resource sharing while securely separating customer data.

According to one embodiment, a storage virtualization environment is provided that includes a network switch system for initializing a virtual volume in a system including a host system, and storage devices. The network switch system includes storage processors including first and second tier storage processors and a Virtualization Coherency Manager (VCM) for receiving storage connectivity identifying which storage processors are connected to selected ones of the storage devices. Further, the network switch system includes a master storage processor for creating a logical tree based on the storage connectivity information, the logical tree reflecting a virtual volume of data distributed across the storage devices and includes (i) first tier objects representing partitions of the virtual volume data and (ii) second tier objects representing a logical configuration of the virtual volume. In one embodiment, the VCM assigns the first tier objects to selective ones of the first tier storage processors and assigns the second tier objects to selective ones of the second tier storage processors based on the logical tree. Further, each of the selective first and second tier storage processors initialize a local portion of the virtual volume to allow the host system to access the virtual volume through the network switch system.

Embodiments of the present invention also include a method for providing a virtual volume in a system including a host system, storage devices, and a network switch system having first and second tier storage processors. The method may be performed by the network switch and includes identifying, for each storage device, any first tier storage processors connected to the respective storage device. Also, the method involves creating a logical tree reflecting a virtual volume of data distributed across the storage devices. The logical tree may include (i) first tier objects representing partitions of the virtual volume data and (ii) second tier objects representing a logical configuration of the virtual volume. Once the logical tree is created, the first tier objects may be assigned to selective ones of the first tier storage processors and the second tier objects assigned to selective ones of the second tier storage processors. The network switch system then manages the virtual volume using the first and second tier objects and storage processors.

Additional features and embodiments of the invention are set forth in part in the following description.

BRIEF DESCRIPTION OF THE DRAWINGS

It is to be understood that both the foregoing general description and the following detailed description are exemplary and explanatory only and are not restrictive of the invention, as claimed. The accompanying drawings, which are incorporated in and constitute a part of this specification, illustrate several embodiments of the invention and together with the description, serve to explain the principles of various aspects of the invention. In the drawings:

DETAILED DESCRIPTION

Figure 1:
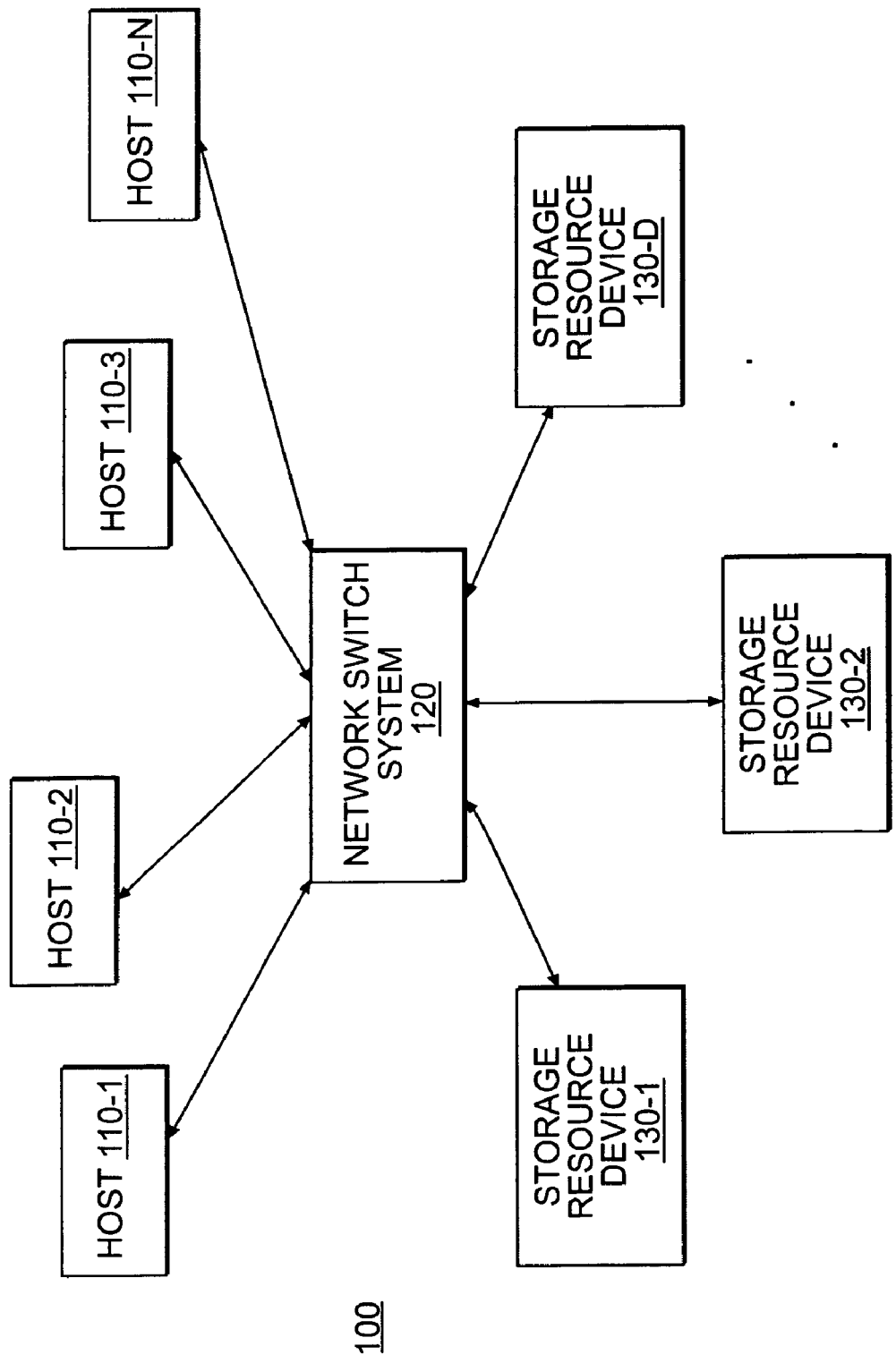
FIG. 1 is a block diagram of a system environment consistent with certain embodiments of the present invention.

The following description refers to the accompanying drawings. Where appropriate, the same reference numbers in different drawings refer to the same or similar elements. The description is organized under the following subheadings:

I. INTRODUCTION

II. SYSTEM ARCHITECTURE

III. OVERVIEW OF NETWORK SWITCH SYSTEM

IV. INITIALIZING A STORAGE VIRTUALIZATION ENVIRONMENT

V. CREATING A VIRTUAL VOLUME

VI. DYNAMICALLY CONFIGURING A VIRTUAL VOLUME
   A. ADDING VIRTUAL VOLUME OBJECTS
   B. MOVING VIRTUAL VOLUME OBJECTS
   C. REMOVING VIRTUAL VOLUME OBJECTS

VII. MULTI-PATH NETWORK SWITCH SYSTEM
   A. OVERVIEW
   B. STORAGE PORT CONTROLLER 1032 AND INTERNAL FABRIC 320-1 ACTIVE
   C. STORAGE PORT CONTROLLER 1032 AND INTERNAL FABRIC 320-2 ACTIVE
   D. STORAGE PORT CONTROLLER 1034 AND INTERNAL FABRIC 320-1 ACTIVE
   E. STORAGE PORT CONTROLLER 1034 AND INTERNAL FABRIC 320-2 ACTIVE
   F. Symmetric Access Storage Device and Internal Fabric 320-1 ACTIVE
   G. SYMMETRIC ACCESS STORAGE DEVICE AND INTERNAL FABRIC 320-2 ACTIVE
   F. FAULT/ERROR RECOVERY AND NOTIFICATION

VIII. SNAPSHOT
   A. OVERVIEW
   B. CREATION OF A SNAPSHOT

IX. FAIL COMPONENT PROCESSING/QUIESCENCE
   A. OVERVIEW

I. INTRODUCTION

Systems and methods consistent with certain described embodiments provide a network switch system residing in a Storage Area Network (SAN) that manages distributed storage resources using storage virtualization processes. The switch scales resources by providing additional bandwidth and resource connections on demand. The result is an increase in the number of host computer systems that may access the switch, the number of storage devices providing resources, and the number of processors that assist in the virtualization of the information maintained by the storage devices.

The network switch system uses a two-tier virtualization architecture for managing one or more virtual volumes for a host system. This architecture includes first tier virtual volume objects that are assigned to storage processors having connections with one or more storage devices hosting virtual volume objects for a given volume. Second tier virtual volume objects are assigned to storage processors having connections with the host system associated with a given volume. Using these objects, the network switch system is capable of creating and managing virtual volumes that are scalable, consistent, and accessible even under abnormal operating conditions.

Embodiments of the network switch system leverage software that maintains state information associated with a given volume to maintain data consistency, availability, and scalability. For example, each storage processor in the system executes state manager software provides virtual volume definition data (e.g., first and second tier volume objects) and state information associated with the given volume. An assigned master state manager collects the definition data and state information from these state managers and generates virtual volume object definitions reflecting a current virtual view of the given volume. The master state manager provides this information to a coherency manager that leverages additional software for distributing the updated virtual volume object definitions to the storage processors for reconfiguring the virtual volume at the storage processor level.

Additionally, embodiments use multi-path processes to maintain data availability in the event of component or communication path failures or faults. The network switch system leverages multiple paths, switch fabrics, processors, resource cards, storage port controllers, and/or other switch components, to route volume requests from a host system to a target storage device. For example, the switch system employs redundant internal fabrics that allow storage processors to receive and/or send Input/Output (IO) requests around faulty components or communication paths. The network switch system integrates symmetrical and asymmetrical multi-path processing models employed by the storage systems to provide transparent fault tolerant access to virtual volume data for a host system.

In addition to multi-path processing, systems and methods consistent with select embodiments provide techniques for handling failures after a virtual volume has been initialized. The virtualization state manager software executed by the storage processor may be configured to handle these failures by managing configuration and state information (e.g., a list of components, a volume definition, current state of the volume, current state of the components, etc.). The virtualization state manager software may periodically conduct an inventory of devices attached to its storage processor to determine state information for those devices; this may include an indication of whether a device, such as an ALU or LU object, is in a good or failed status. The manager software may provide the failure information to a host system or administrator, as well as perform processes to manage the failed component without disruption of the volume or the loss of data. Alternatively, the virtualization state manager may inventory the attached devices based on a detected event or condition, such as a fault or error event. For example, the manager may receive an interrupt from another component of the network switch system (or external device) that initiates inventory operations.

Systems and methods consistent with select embodiments may also provide a "snapshot" of virtual volumes. A snapshot is a point-in-time representation of a virtual volume; it may be presented to a host system and used, for example, as a backup copy of the virtual volume. Embodiments of the invention use snapshot images to re-create a virtual volume as it appeared at a given point in time following an event, such as a network switch system and/or component failure. Moreover, the snapshot may be provided to the host system as a backup volume when the underlying virtual volume is inaccessible or inadvertently altered. Also, the network switch system may maintain a change log to track changes made to a virtual volume after a snapshot point-in-time image has been created.

The described features of the invention may be implemented in various environments. Such environments may be specially constructed for performing the designated processes or they may include a general purpose computer or computing platform selectively activated or reconfigured by program code to provide the necessary functionality. The processes disclosed herein are not inherently related to any particular computer or other apparatus, and may be implemented by a suitable combination of hardware, software, and/or firmware.

The invention also relates to computer readable media that include program instructions or program code for performing various computer-implemented operations. The program instructions may be specially designed and constructed for the purposes of the invention, or they may be of the kind well-known and available to those having skill in the computer software arts. Examples of program instructions include machine code, such as that produced by a compiler, and files containing a high level code that can be executed by the computer using an interpreter.

II. SYSTEM ARCHITECTURE

FIG. 1 is a block diagram of a SAN 100 consistent with certain embodiments of the invention. SAN 100 includes one or more hosts 110-1 to 110-N, a network switch system 120, and one or more storage resource devices 130-1 to 130-D.

Hosts 110-1 to 110-N may each be a computer system associated with a user, business or other type of entity that uses network switch system 120 for managing storage space. For instance, hosts 110-1 to 110-N may each include one or more computers, such as servers, desktop computers, workstations, laptops, personal digital assistants, or any other type of computing system configured to request and/or receive information from remote entities, such as network switch system 120. In certain embodiments, hosts 110-1 to 110-N may use fibre channel switches to connect to network switch system 120, but other types of communication technologies may be employed. Using network switch system 120, hosts 110-1 to 110-N manage storage resources (i.e., storage space). For example, a business employee operating a server in host 110-1 may request, obtain, and use storage space offered by network switch system 120 via storage resource devices 130-1 to 130-D.

System 120 is a switch-based processing system for performing one or more virtualization processes that create and manage one or more virtual volumes of data for hosts 110-1 to 110-N. A virtual volume is a group of information that is distributed across multiple storage devices (e.g., storage resource devices 130-1 to 130-D). In one embodiment, a virtual volume may include a set of Logical Units (LUs); the LUs within a virtual volume are addressable blocks of memory included in one or more of storage devices 130-1 to 130-N. Switch 120 assigns a unique identifier to each LU, allowing them to be accessed by various components of the system.

In one aspect, the unique identifiers may be based on World Wide Names (WWNs) defined by the Institute of Electrical and Electronics Engineers, Inc. (IEEE), and are used by Small Computer System Interfaces (SCSIs) to identify physical and logical entities. A WWN may be a 8 or 16 byte value depending on the type of entity the number represents. For example, the 8 byte value is typically used for physical entities, such as ports, nodes, disk drives, etc., while the 16 byte value is used for logical entities that are dynamic in number, such as storage array volumes. Each WWN includes segments that allow the entity represented by the WWN to be unique. These segments may include a Vendor Specific ID (VSID) reflecting bits managed by a vendor (e.g., network switch system 120) that ensure the WWN is unique. Also, the WWN may include an IEEE company ID that is a registered identifier provided by the IEEE. In one aspect, the unique identifier may be a shortened version of the WWN that network switch system 120 uses to uniquely identify objects, such as LUs and are used by one or more virtualization elements of network switch system 120 for referencing objects.

Additionally, system 120 may assign device identifiers (e.g., dev_t identifiers) to individual Attached Logical Units (ALUs) and other types of virtual volume devices (e.g., storage processors, etc.). These identifiers are handles used by logic, state machines, and driver stacks operating with system 120 for referencing virtual volume devices. In one aspect, the device identifiers are transient in that they are recreated following initialization of network switch system 120.

Network switch 120 presents a virtual volume of distributed LUs to hosts 110-1 to 110-N as a single user volume representing a block of storage space and data that the respective host 110-1 to 110-N may use as a storage resource. In other words, hosts 110-1 to 110-N need not be aware of the manner in which switch 120 partitions, separates, or groups data in each virtual volume. Switch 120 also performs storage switch functionalities described in commonly-owned PCT International Patent Application No. PCT/US01/46272, which is hereby incorporated by reference in its entirety.

Storage resource devices 130-1 to 130-D are one or more storage devices that maintain data for hosts 110-1 to 110-N. Devices 130-1 to 130-D may include disk arrays that use multiple Direct Access Storage Devices (DASDs) arranged in fault tolerant and/or scalable configurations. Alternatively, devices 130-1 to 130-D may be implemented by DASDs in non-array formats. Further, the devices may include optical disk devices, tape storage devices, and any other type of storage device that may store data and provide access to the stored data. For example, devices 130-1 to 130-D may include one or more storage port controllers that facilitate access to the data stored in the storage devices, as well as any other form of infrastructure that enables switch 120 to read, write, and modify data maintained by devices 130-1 to 130-D. Devices 130-1 to 130-D include the LUs created by switch 120 and that make up the virtual volumes transparently used by hosts 110-1 to 110-N.

Figure 2:
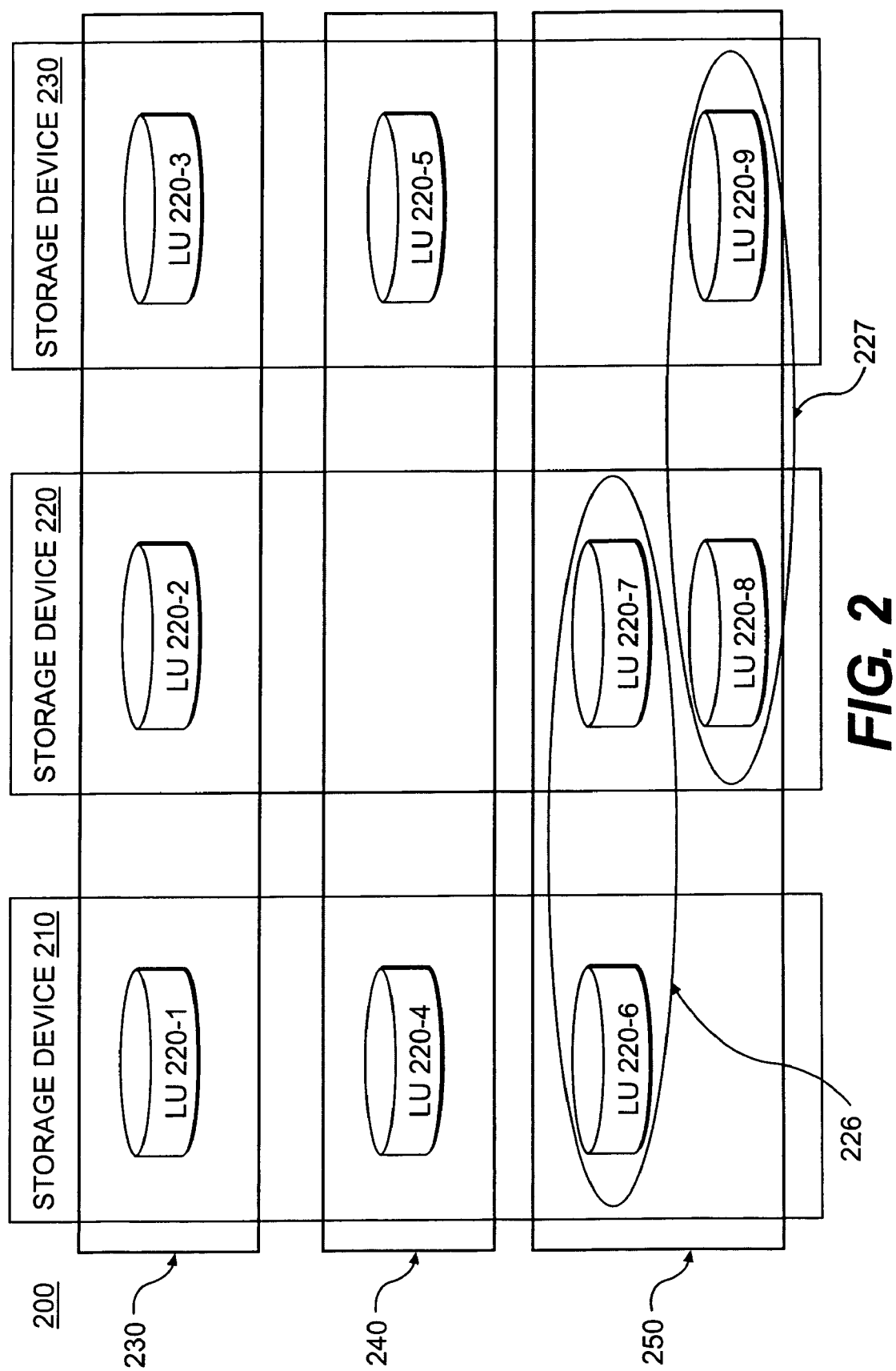
FIG. 2 is a block diagram of a storage device configuration consistent with certain embodiments of the present invention.

FIG. 2 is a block diagram of a storage device configuration 200 illustrating three virtual volumes 230, 240 and 250 that may be created by network switch system 120. As shown, configuration 200 includes three storage devices 210, 220, and 230, each of which may include one or more LUs 220-1 to 220-9 that represent virtual blocks of data associated with different types of virtual volumes 230, 240 and 250. For example, virtual volume 230 is a striped virtual volume including portions of logical units 220-1, 220-2, and 220-3 distributed across storage devices 210, 220 and 230. Virtual volume 240 is a mirroring volume including portions of two logical units 220-4 and 220-5, with identical copies of data distributed across storage devices 210 and 230. And, virtual volume 250 is a striping over mirroring volume including portions of two mirrored pairs 226 and 227 of logical units (e.g., logical units 220-6, 220-7 and logical units 220-8, 220-9), distributed across storage devices 210, 220 and 230. The above-described virtual volumes are not intended to be limiting and network switch system 120 may create and manage different types of virtual volumes distributed across different numbers of storage devices using different numbers of logical units. For example, each ALU used by network switch system 120 may be partitioned and each partition may be used for different virtual volumes.

III. OVERVIEW OF NETWORK SWITCH SYSTEM

As explained above, network switch system 120 creates and manages virtual volumes for hosts 110-1 to 110-N. To perform these functions, network switch system 120 may use various configurations of processors, storage access channels, and virtualization software.

Figure 3:
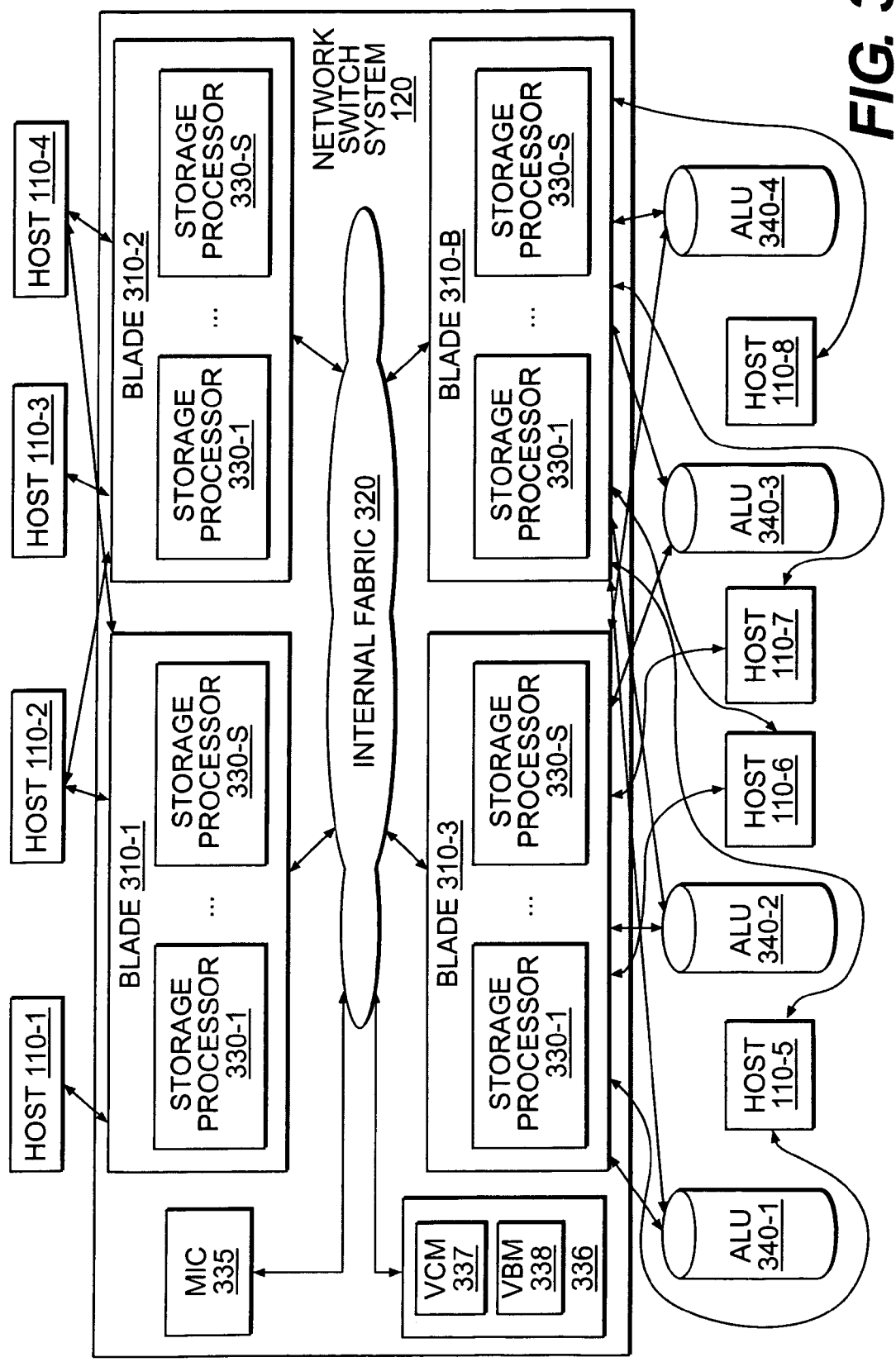
FIG. 3 is a block diagram of a network switch system consistent with certain embodiments of the present invention.

FIG. 3 is a block diagram of a configuration of network switch system 120 consistent with certain embodiments of the invention. As shown, system 120 includes one or more processing blades 310-1 to 310-B interconnected by internal fabric 320. Processing blades 310-1 to 310-B each include one or more Storage Processors (SPs) 330-1 to 330-S. Each blade 310 may include other processing components (not shown), such as other hardware and/or software components that leverage and/or are leveraged by storage processors 330-1 to 330-S. Although FIG. 3 shows blades 310-1 to 310-B each including up to "S" storage processors, a blade 310 may include a different or the same number of storage processors 330-1 to 330-S as other blades in the system 120. Furthermore, system 120 may include any number of blades 310.

SPs 330-1 to 330-S each represent a processing component that includes hardware and/or software for performing various virtualization processes associated with the functionalities of network switch system 120. SPs 330-1 to 330-S are configured to process requests from one or more hosts 110-1 to 110-8 connected to a respective SP 330. For example, host 110-1 may be connected to SP 330-1 of blade 310-1 through a fibre channel port, while host 110-2 is connected to both SP 330-S of blade 310-1 and SP 330-1 of blade 310-2. Further, one or more of SPs 330 may be connected to one or more Attached Logical Units (ALUs) 340-1 to 340-4, which represent LUs that are stored on a storage device (e.g., storage resource device 130) and attached to system 120. As shown in FIG. 3, some SPs 330 of system 120 may or may not be connected to an ALU 340-1 to 340-4 and/or a host 110-1 to 110-N. Embodiments of the invention use these connections and access capabilities to configure a storage virtualization environment for managing virtual volumes for hosts 110-1 to 110-N. Further, each SP 330 includes multiple fibre channel ports that may be selectively connected to an ALU and a host. For example, storage processor 330-1 in blade 310-1 may include two fibre channel ports, one connected to ALU 340-1 and another connected to host 110-5. Thus, any virtual volume presented to host 110-5 over the port connected to host 110-5 need not be exposed to the devices connected to the port associated with ALU 340-1.

Internal fabric 320 is a communication fabric that includes one or more communication paths interconnecting one or more of SPs 330-1 to 330-S in system 120. In one embodiment, internal fabric 320 includes redundant paths connected to each SP 330 that allow system 120 to continue communications between two or more SPs 330 even when a communication path experiences a fault or failure condition.

Network switch system 120 also includes a Management Interface Card (MIC) 335 that is connected to internal fabric 320, that includes hardware and/or software to provide interface functionalities to enable a user operating a host 110 to communicate with system 120. For example, MIC 335 may include user interface software, such as Graphical User Interface (GUI) and Command Line Interface (CLI) processes, that translate user inputs and/or requests into commands for processing by an SP hosting a given virtual volume. For example, MIC 335 may receive a request from a user operating a host 110-1 to 110-N for configuring or updating a virtual volume. Further, MIC 335 may execute software processes that manage various object, security, and storage virtualization definitions used by system 120. MIC 335 also maintains virtual volume location structure information that defines the physical mappings for each virtual volume managed by network switch system 120. These mappings reflect the relationship between hosts 110-1 to 110-N and any of their corresponding virtual volumes (i.e., the mappings define which virtual volumes are accessible ("seen") by certain hosts 110-1 to 110-N). MIC 335 may exchange information with any processing element connected to internal fabric 320, such as SPs 330-1 to 330-S in each of blades 310-1 to 310-5. Alternatively, or additionally, MIC 335 may be attached to one or more processing elements in system 120 through one or more dedicated communication paths, such as control or data path fabrics.

Also, network switch system 120 may include a co-processing management component 336 with hardware and/or software that performs various storage virtualization processes. In one embodiment, co-processing management component 336 includes a Virtualization Coherency Manager (VCM) 337 and Virtualization Block Manager (VBM) 338 that are software stored in a memory device (not shown) and executed by one or more processing units (not shown) to manage the virtualization of information managed by system 120. Component 336 is attached to internal fabric 320 to facilitate the exchange of information between VCM 337, VBM 338, and any other processing elements connected to fabric 320, such as SPs 330-1 to 330-S. Alternatively, or additionally, co-processing management component 336 may be connected to one or more of these processing elements through dedicated communication paths (not shown).

VCM 337 performs a number of volume configuration and management processes consistent with embodiments of the present invention. For example, VCM 337 distributes virtual volume objects to selected SPs and manages the redistribution of these objects caused by certain events, such as failures, performance changes, etc. VBM 338 provides proxy capabilities for VCM 337 in reporting system configuration information. Further, in response to user requests forwarded from MIC 335, VBM 338 builds and updates virtual volume trees reflecting logical relationships between virtual volume objects and passes the trees to VCM 337 for subsequent distribution to the selected SPs.

Although FIG. 3 shows a certain number of ALUs 340 and hosts 110, network switch system 120 may be connected to any number of these elements. For example, system 120 may include SPs 330 that are connected to additional or fewer hosts 110 and/or ALUs 340 than shown in FIG. 3. As explained above, SPs 330-1 to 330-S are configured to help manage the storage virtualization features consistent with embodiments of the invention.

Figure 4:
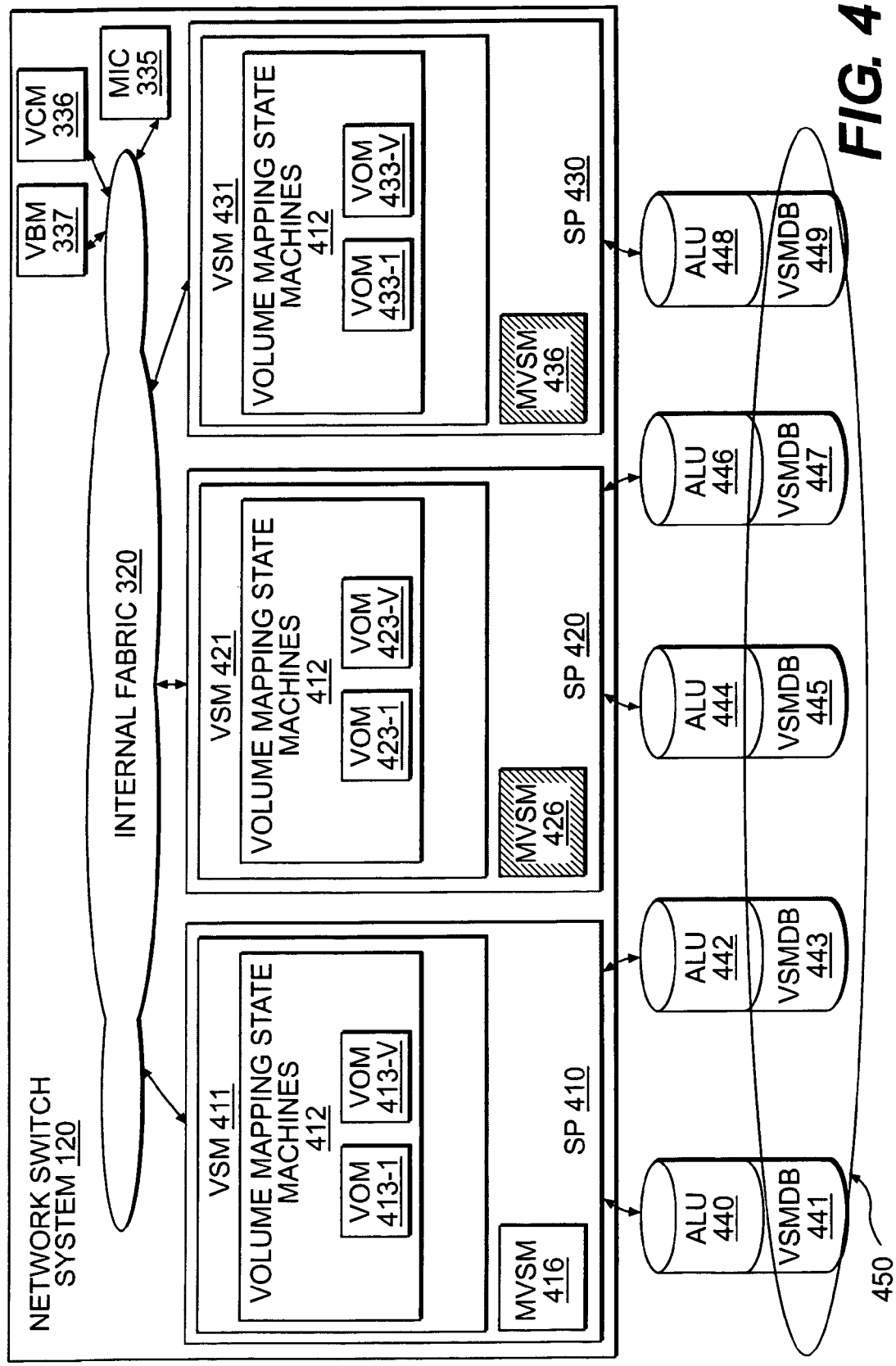
FIG. 4 is a block diagram of a storage processor configuration within the network switch system shown in FIG. 3, consistent with certain embodiments of the present invention.

FIG. 4 is a block diagram of an exemplary SP configuration in network switch system 120. As shown, system 120 may include a number of SPs 410, 420, and 430 within one or more blades (e.g., blades 310-1 to 310-B). Each SP is configured with software that, when executed by a processor, performs various types of storage virtualization processes for managing LUs included in any ALU connected to switch system 120, such as ALUs 440-448. Although FIG. 4 shows three SPs (410, 420 and 430) and five ALUs (440, 442, 444, 446 and 448), any number of SPs and ALUs may be implemented.

In one embodiment, each SP 410, 420 and 430 includes a Virtualization State Manager (VSM) 411, 421, and 431 respectively that comprise program code stored in a memory device. VSMs 411-431 provide, when executed by a processor, configuration and state transition logic used to manage virtual volume object definitions for as long as these virtual volumes are recognized by network switch 120 and virtual volume objects are assigned to their corresponding storage processors. That is, each SP hosting a VSM (e.g., SP 410 and VSM 411) receives those objects that are associated with a virtual volume that the SP is assigned. Thus, virtual volume objects are only passed to SPs as they are needed to manage a virtual volume associated with the objects.

Virtual volume object definitions include configuration information and state data that define each virtual volume such that system 120 may recognize which LUs, ALUs, SPs, and/or other storage or processing elements are being used to manage, create, and/or adjust the volumes. Thus, the VSMs include software mechanisms for storing and retrieving the configuration data that defines a virtual volume's attributes, states, and component assignments.

VSMs 411, 421 and 431 perform a number of different operations, including providing information identifying any ALUs that are connected to a SP hosting the respecting VSM, instantiating volume object definition and relationship trees provided by VCM 33, and notifying VCM 337 of any component failures (e.g., ALUs). ALUs 440-448 persistently store volume configuration and state information. Collectively, the locally stored configuration and state information globally represent the configuration and state information for an entire virtual volume. This global representation is known as a VSM DataBase (VSMDB) 450. Network switch system 120 distributes VSMDB 450 across multiple ALUs 440-448 allowing each ALU 440-448 to host a local version of the VSMDB (e.g., VSMDBs 441-449, respectively). Each local VSMDB 441-449 includes VSMDB objects for a virtual volume associated with the SP connected to the ALU hosting the local VSMDB objects.

In one embodiment, the VSMDB objects each include an object list referencing one or more ALU objects and virtual volume objects associated with the respective VSMDB 441-449. An ALU object may include information identifying the ALU hosting the object, the ALU's state, and any extents (i.e., continuous blocks of data in a memory location) that have not been allocated to a virtual volume. A virtual volume object may include information defining and identifying the state and components of a virtual volume, the state of the virtual volume, the type of virtual volume, and the size of the virtual volume. In one embodiment, network switch system 120 may define and store the virtual volume objects in a manner to provide at least the same level of redundancy as presented by the virtual volume described by these objects.

For example, consider an a striping object having eight members. Each of the object definitions for the stripe are used to build a virtual volume tree of nine objects including a stripe object on top of eight partition objects representing the eight members of the stripe. Each of the eight partition objects point to a portion of a respective ALU managed by network switch system 120. In this example, to incorporate certain redundancy aspects of the present invention, network switch system 120 may store a copy of the stripe object on each of the eight ALUs having the respective ones of the eight partition objects associated with the virtual volume tree. Each partition object is stored solely on an ALU associated with that partition. In other words, a first of the eight partition objects and the stripe object may be stored on a first of the eight ALUs, a second of the eight partition objects and the stripe object is stored on a second ALU, a third of the eight partition objects and the stripe object is stored on a third ALU, and so forth. Accordingly, by having redundancy with the striping object, embodiments of the present invention allow a virtual volume having N' components to have N' levels of redundancy with respect to certain virtual volume object data (e.g., the stripe object in the above example).

ALUs 440-448 may include a disk space region, where data is stored, and a Meta Data Region (MDR) for storing the VSMDB objects. Each ALU 440-448 that is available for use by network switch system 120 includes a label directory having information for managing the partitioning of the data within the ALU during runtime operations. In one embodiment, the label directory includes one or more sectors for storing large numbers of partitions. Further, the label directory region may be duplicated, time stamped, and check summed for recovery purposes following a power failure.

The MDR includes a MDR directory for storing a signature, or Storage Utility Switch Identifier (SUSID) string, that associates the ALU having such a signature with network switch system 120. ALUs having MDRs without a valid SUSID may determined by system 120 as unaffiliated with the virtualization environment managed by system 120. In certain aspects of the invention however, network switch system 120 may supports legacy ALUs that do not include MDRs or SUSIDs. In these instances, network switch system 120 may support features that allow access to data on the legacy ALUs without requiring MDRs to be written in these ALUs.

The MDR also includes a VSM object data region that includes objects used during initialization of the virtualization system. The VSM object data region persistently stores created virtual volume objects, LU mappings, etc. The MDR also includes objects used by system 120 to configure a subset of ALUs 440-448, called a Global Structure (GS) ALU set. ALUs included in the GS ALU set include an n-way mirrored image of data that is recoverable in the event of a failure. In one embodiment, at least six ALUs can be maintained in a GS ALU set that are located on separate target storage resource devices. Thus, the GS ALUs collectively contain a multi-sector region that makes up a VSMDB boot region. The GS ALUs include an active list header pointer that includes two sectors that indicate which of two active list pointer structures are currently valid and which can be used for an update of information included in these ALUs.

Further, as explained, network switch system 120 supports legacy ALU operations that do not comprise MDR data. In this instance, network switch system 120 may use a special region in the GS ALU set (described below) that is reserved for MDR data that normally would be written in the legacy ALUs. Network switch system 120 uses the reserved GS ALU set regions to provide services on top of the legacy volume services, such as creating and managing virtual legacy volumes. Further, network switch system 120 may provide direct access volumes, which support direct ALU volume access operations. That is, a host may pass commands through switch system 120 directly to an ALU.

VSMs 411-431 may each include one or more state machines for managing the virtual configuration of data included in ALUs 440-448. In one embodiment, VSMs 411-431 may include virtual Volume state Machines (VOMs), 412-432 (see FIG. 4). VOMs 412-432 manage the ALU and virtual volume objects included in VSMDB 450 and may include one or more sub-VOMs 413-1 to 413-V, 423-1 to 423-V, and 433-1 to 433-V, respectively, that manage the virtualization of storage devices for different types of virtual volume mappings of ALUs 440-448 supported by system 120. Such mappings may include partition mappings, striping partition mappings, mirroring partition mappings, striping over mirroring partition mappings, concatenation of virtual volumes mappings, etc. The VOMs manage the virtualization mappings for configuration, state changes, and data flow. For example, VOM 413-1 may provide VSM 411 with current state information associated with one or more virtualization objects for a particular type of partition (e.g., mirroring) associated with ALUs 440 and 442. At the same time, VOM 423-1 may provide VSM 421 with the same type of information associated with virtualization objects corresponding to ALUs 444 and 446.

In addition to VSM software, SPs 410-430 also include Master VSM (MVSM) software 416-436. This software is present on every SP 410-430, but in accordance with certain embodiments of the invention, may only be activated in a selected SP. For example, MVSP 416 is shown in FIG. 4 as active, while MVSMs 426 and 436 are shown as inactive (i.e., blocked out). It should be noted, however, any one of SPs 410-430 (or any SP) in network switch 120 may include an activated MVSM. In one embodiment, VCM 336 activates only one of the SPs included in system 120, thus rendering the SP hosting the activated MVSM as a Master Virtualization Storage Processor (MVSP). In FIG. 4, because MVSM 416 is activated, SP 410 is designated as a MVSP. System 120, however, is capable of moving MVSP status to another SP at any time, such as when a current MVSP fails during runtime operations.

In addition to the VSM tasks performed by an SP, an SP designated as the MVSP, may perform additional tasks of interfacing the virtualization information to the distributed VSMDB 450. These tasks include building a system image reflecting how each virtual volume is currently configured in system 120 and ALUs 440-448, passing the system image to VCM 337 and/or MIC 335, updating the system image as requested by VCM 337 and/or MIC 335, managing and updating VSMDB 450, and providing MIC 335 and/or VCM 337 with the updated configuration and state information. Also, as a MVSP, SP 410 may gain access to VSMDB 445-449 stored in ALUs 444-448 connected to SPs 420 and 430. Non-MVSPs do not have such access privileges. Further, it should be noted that while activated, MVSM 416 is the only component that may access and manage VSMDBs 445-449. Thus, VSMs 411-431 cannot access, manage, or modify VSMDBs 445-449.

IV. INITIALIZING A STORAGE VIRTUALIZATION ENVIRONMENT

Using the configuration of SPs 410-430 and the virtual volume distributions across ALUs 440-448, network switch system 120 may configure and manage one or more virtual volumes for one or more hosts 110-1 to 110-N. To do so, network switch system 120 performs one or more storage virtualization initialization processes.

Figure 5A:
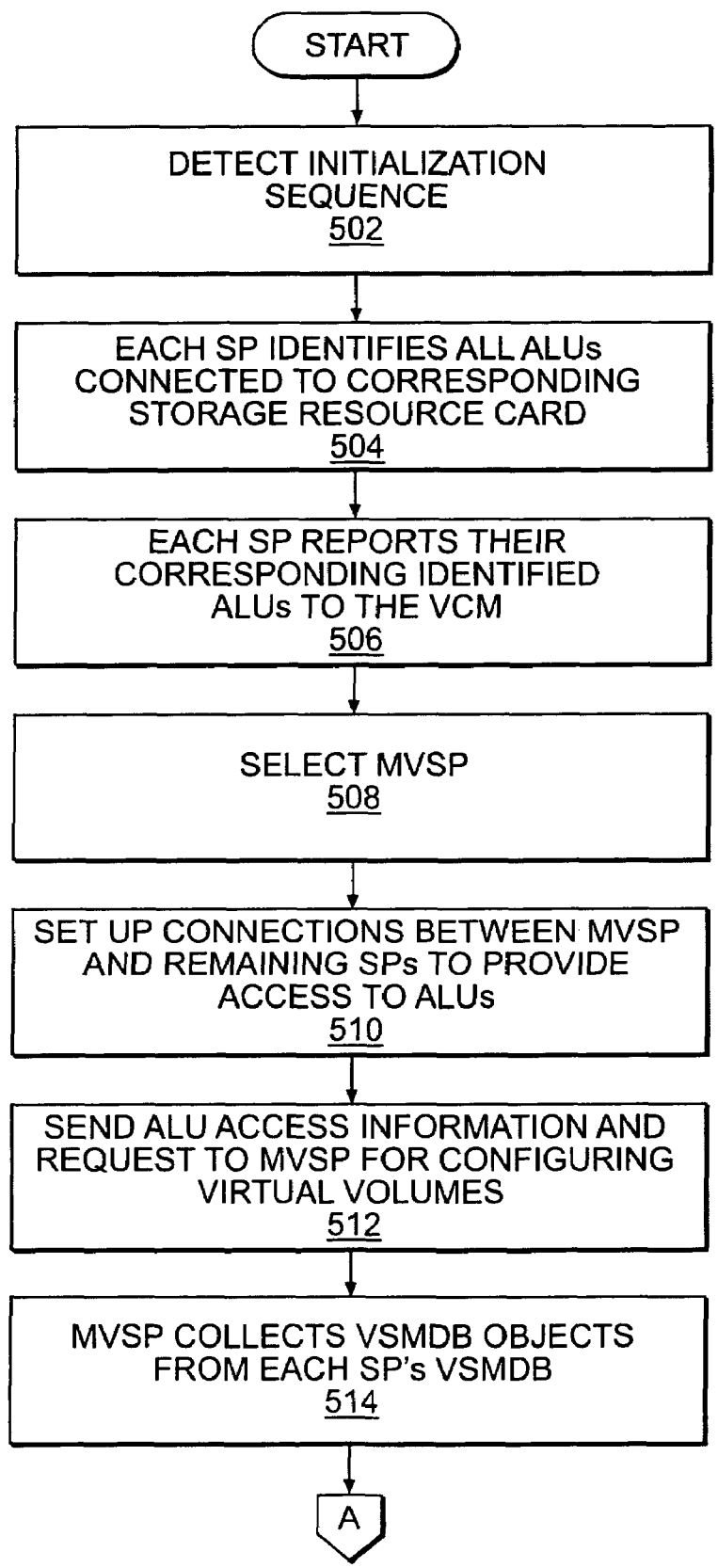
FIGS. 5A-5C are flowcharts of a storage virtualization initialization process consistent with certain embodiments of the present invention.
Figure 5B:
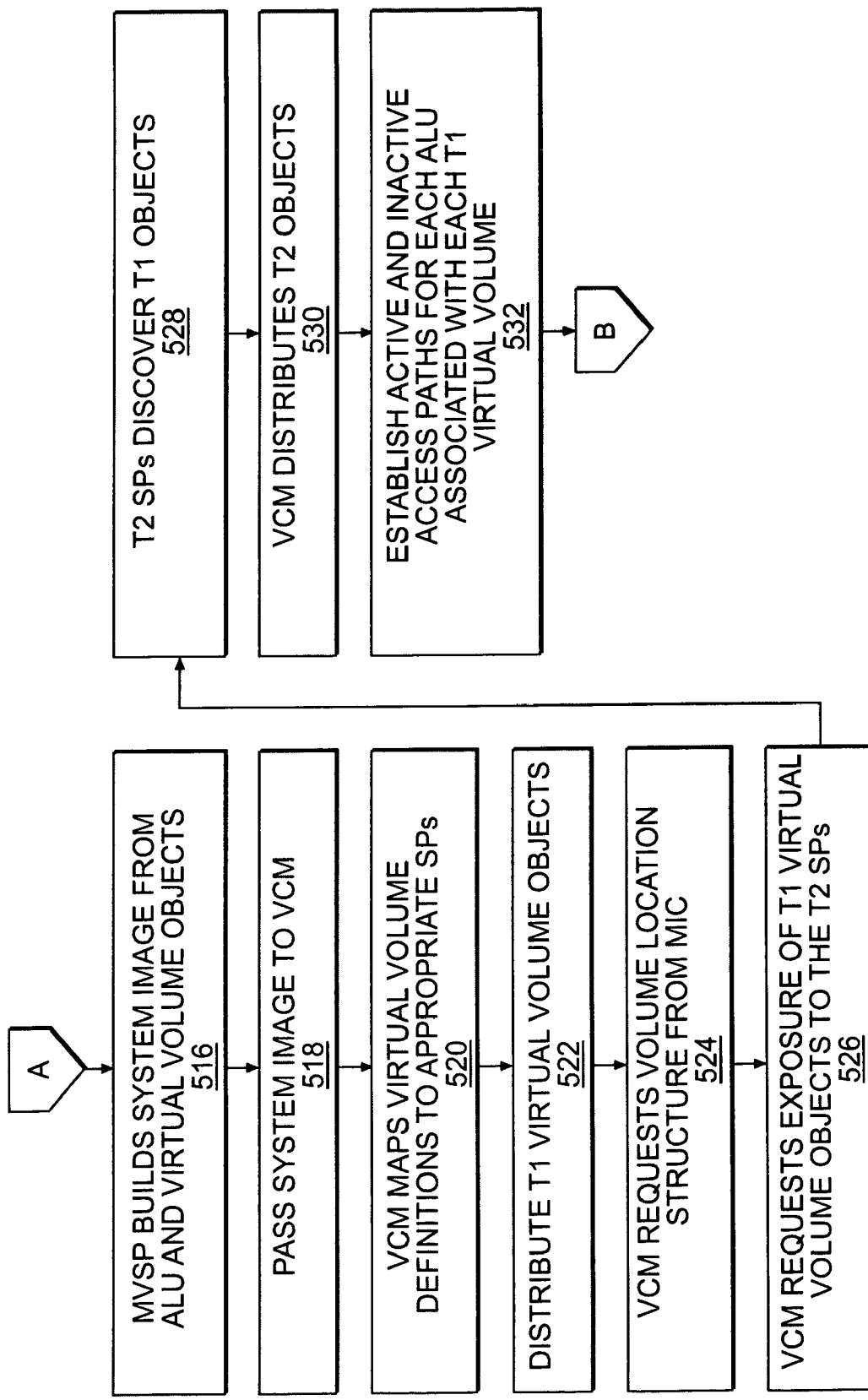
Figure 5C:
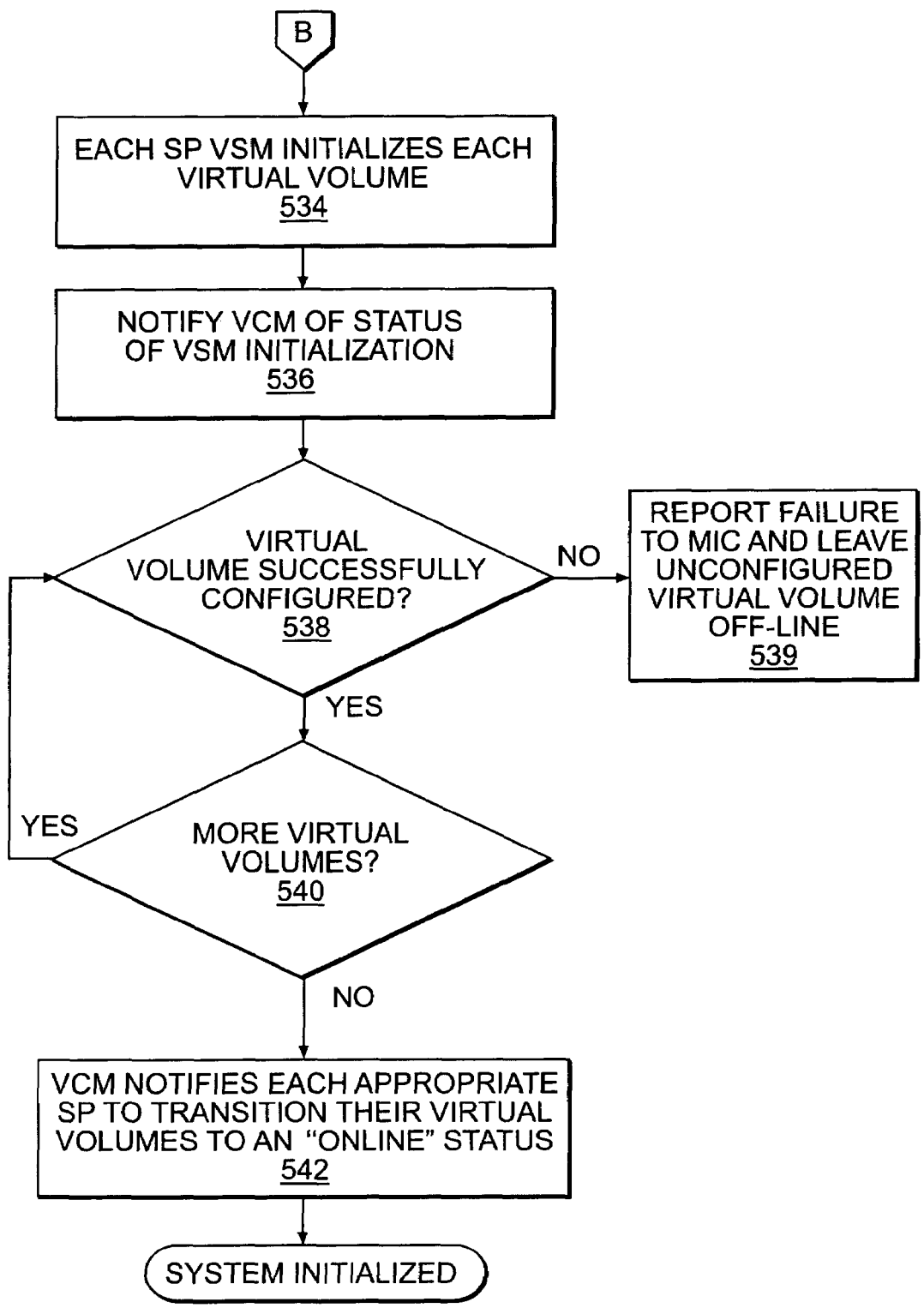

FIGS. 5A-5C are flowcharts of a storage virtualization initialization process consistent with embodiments of the invention. Although the following description of the initialization process is described with reference to FIG. 4, the process is intended to apply to any configuration of network switch system 120 (i.e., any number of SPs, connected ALUs, and/or hosts).

To initialize a storage virtualization environment, network switch system 120 provides an initialization event signal to selected processing elements, such as SPs 410-430, MIC 335, VCM 337, and/or VBM 338. Upon recognizing an initialization event (Step 502), each SP VSM (e.g., VSM 411) may initialize itself. Following initialization, each SP identifies every ALU connected to the communication ports of a Storage Resource Card (SRC) hosting the respective SP (Step 504). In one embodiment, each SRC includes fibre channel interfaces that interconnect hosts and/or ALUs assigned to one of the SP SRCs. Each SP generates commands for scanning the interfaces to identify any ALUs that are connected to its host SRC. The SP may collect ALU identifying data, memory space data, and any other type of configuration information associated with the storage capabilities of the connected ALUs. In one embodiment, each SP may access its respective ALU's VSMDB MDRs to determine whether a valid SUSID is stored in the ALU's MDR.

An SP that discovers a connected ALU without a valid SUSID signature associating the ALU with network switch system 120 is placed in a "non-owned" ALU pool of storage resources. This pool includes ALUs that may not be presented to any SP's VSM or other users of VSMDB. In one embodiment, the ALUs included in the non-owned ALU pool may be presented to a host 110-1 to 110-N for subsequent discovery and association with system 120. Also, an activated MVSP (i.e., SP 410 via activated MVSM 416) may discover the GS ALU set information stored in the MDR VSM boot region of their corresponding VSMDBs. Thus, in situations where legacy ALUs may be implemented, the reserved portion of the GS ALU set may be accessed to collect MDR information associated with any legacy ALUs and associated data services metadata affiliated with network switch system 120.

Once an SP has collected the appropriate information associated with any identified ALUs, it reports this information to VCM 337 via internal fabric 320 (Step 506). Every SP (e.g., SPs 410-430) in system 120 having an ALU connected to its fibre channel interfaces performs these functions, allowing VCM 337 to obtain a virtual view of the number and types of ALUs connected and available to system 120 and the corresponding SPs hosting these connections.

VCM 337 collects the ALU information received from each SP 410-430 and based on this information, determines which of the SPs in system 120 should be designated as a MVSP (Step 508). In one embodiment, VCM 337 may consider one or more attributes of each SP 410-430, and its associated ALUs 440-448. For example, VCM 337 may select an MVSP based on the largest number of ALUs connected to a given SP. Alternatively, VCM 337 may consider the available processing capabilities of each SP, the current workload of each SP in performing other tasks for switch 120, fault tolerant capabilities (e.g., available redundant communication paths, processing devices, memory devices, etc.), and any other type of attribute associated with each SP and its ability to perform the additional duties of an MVSP.

Once VCM 337 selects an appropriate SP (e.g., SP 410) as MVSP, it notifies the selected SP, thus activating the MVSM residing in the selected SP. For example, in FIG. 4, VCM 337 selects SP 410 as MVSP. Accordingly, MVSM 416 is activated and configured to perform its programmed tasks. For purposes of illustration, SP 410 is also be referred to as MVSP 410 due to the above designation by VCM 337. Further, VCM 337 sets up communications between MVSP 410 and the remaining SPs 420 and 430 in network switch system 120 to allow access by MVSP 410 to all ALUs 440-448 (Step 510). In one embodiment, VCM 337 may use Internet SCSI (iSCSI) connection commands to set up multiple connections between MVSP 410 and SPs 420 and 430 that enable MVSP 410 to have redundant access to ALUs 440-448, such as a primary and secondary communication path.

Once the ALU connections are established, VCM 337 may send access information to MVSP 410 along with a request for MVSP 410 to configure one or more virtual volumes based on data stored in ALUs 440-448 (Step 512). The access information may include iSCSI information for each ALU specifying a iSCSI target and Logical Unit Number (LUN). A LUN is a unique identifier used on a iSCSI bus that enables it to differentiate between up to a certain number separate devices (i.e., logical units).

The request to configure the virtual volumes directs MVSP 410, via MVSM 416, to obtain a system image of the data partitioned across ALUs 440-448 by collecting VSMDB objects from each VSMDB 441-449 through ALUs 440-448 (Step 514). Accordingly, MVSM 416 may access each ALU 440-448, through their corresponding SPs 410-430 to collect the appropriate VSMDB objects. Thus, MVSP 416 may access its local ALUs 440 and 442 to obtain the appropriate VSMDB objects from VSMDB 441 and 443, respectively. Moreover, MVSM 416 uses SPs 420 and 430 as pass-through elements to access VSMDBs 445, 447, and 449 located in ALUs 444, 446, and 448, respectively.

MVSP 416 uses the VSMDB objects collected from VSMDB 450 to build a system image (i.e., virtual representation) of the data stored in ALUs 440-448 (Step 516). The system image identifies the data objects stored in ALUs 440-448 and their relationship to corresponding SPs 410-430. That is, the system image is a collection of virtual volume object definitions reflecting relationships between different forms of associations between the LU objects included in ALUs 440-448, such as partitions, mirrored pairs, striped volumes of segmented LUs, etc. In one embodiment, the system image may include virtual volume object components such as WWNs for LUs located within ALUs 440-448, access information for these ALUs, and state information associated with these objects.

In one embodiment, the virtual volume object definitions make up a two-tier virtual tree including a hierarchical view of the ALU objects and their relationship with other objects in ALUs 440-448. The first tier represents those objects and their associations that are affiliated with volume management processes that may not be replicated across multiple SPs because of the dynamic nature of their state mapping definitions and functionalities, such as partitions and snapshots (described below in connection with subheading VIII) which may frequently change during runtime operations due to network switch system 120 state changes. The second tier represents those objects and their associations that are affiliated with volume management processes that provide host access and include volume definitions that are nearly static during runtime operations. These types of definitions may include striping, mirroring, striping over mirroring, and concatenation configuration definitions and processes.

Figure 6:
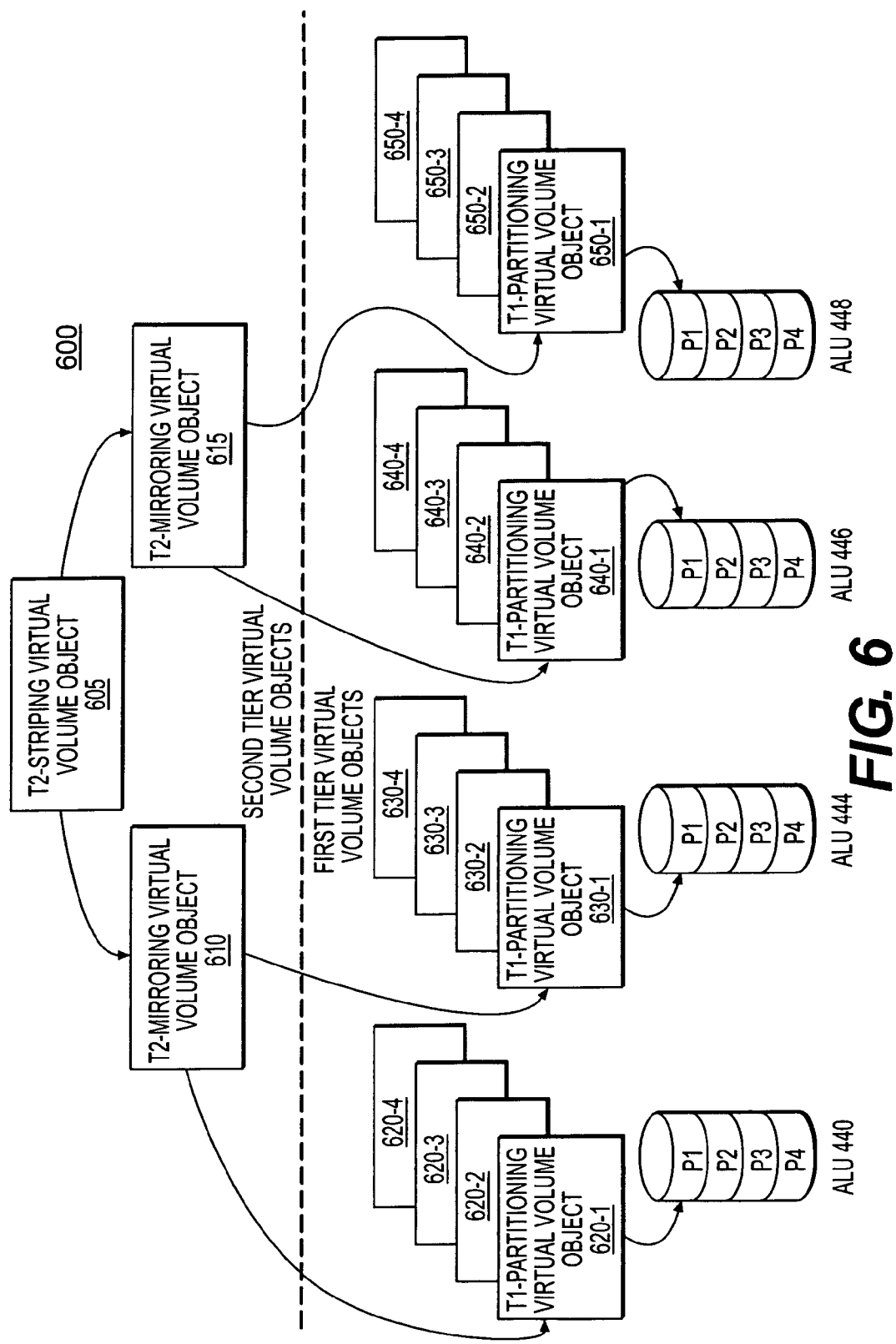
FIG. 6 is a block diagram of a global system image of a virtual volume consistent with certain embodiments of the present invention.

To better illustrate the two-tier virtual volume tree functionalities, FIG. 6 is a block diagram of a virtual volume tree 600 generated by MVSM 416 for initializing a striping over mirroring type of virtual volume.

As shown, MVSM 416 prepares virtual volume tree 600 by determining which volume objects are associated with second tier (i.e., T2) type functionalities, such as the mirrored and striped volume objects 605-615. Further, MVSM 416 determines which volume objects are associated with first tier (i.e., T1) type functionalities, such as the dynamic nature of partitioned objects 620-650. Using these relationships, MVSM 416 may configure tree 600 in a manner that defines the relationships between each type of data configuration. For example, T2 striping object 605 reflects the virtual volume object definitions that are striped across multiple ALUs, while T2 mirroring objects 610 and 615 reflect the virtual volume object definitions that are mirrored across multiple ALUs. The T1 partitioning objects 620-650 reflect the virtual volume object definitions that are partitioned among respective ALUs 440-448. Further, tree 600 defines the relationships between each of the T2 and/or T1 object definitions. For example, T2 striping object 605 has a relationship with T2 mirroring objects 610 and 615. Along the same lines, T2 mirroring object 610 has relationships with T1 partitioning objects 620 and 630.

It should be noted that the virtual volume tree 600 shown in FIG. 6 is not intended to be limiting and VBM 338 may configure many different types of trees associated with different forms of virtual volume types, such as mirroring, striping, and partitioning configurations.

Returning to FIG. 5B, MVSM 416 stores the built system image in a memory device within MVSP 410 and then passes the system image to VCM 337 through internal fabric 320 (Step 518). VCM 337 stores the system image (i.e., tree(s)) in a memory that is accessible by MIC 335, thus allowing users of hosts 110-1 to 110-N to access the information reflecting the image.

Once received, VCM 337 performs a mapping process that maps the virtual volume definitions configured by MVSM 416 to appropriate SPs 410-430 (Step 520). In one embodiment, VCM 337 maps the virtual volume object definitions based on each SP's 410-430 connections to ALUs 440-448 and/or hosts 110-1 to 110-N. In one embodiment, T1 layer objects (e.g., objects 620-650) are assigned to SPs having connections to those ALUs 440-448 that include the partitions identified in the T1 layer objects. Those SPs that are assigned T1 objects are referred to as T1 SPs, or first tier SPs. T2 layer objects, on the other hand, are assigned to SPs based on their connections to one or more hosts 110-1 to 110-N. In other words, the T2 layer objects are assigned to those SPs that can provide host access to the virtual volume configured by MVSM 416. These SPs may be referred to as T2 SPs or second tier SPs. Further, because SPs can be connected to both a host and an ALU, VCM 337 may assign both T1 and T2 layer objects to such SPs.

VCM 337 then distributes T1 layer objects (i.e., T1 sub-trees and the object definitions) to the VSMs of the appropriate T1 SPs (Step 522). VCM 337 may distribute the T1 objects without pointer data referencing any sibling or parent objects. For example, VCM 337 may assign T1 object 620-1 to SP 410 because that SP is connected to ALU 440, which maintains the corresponding LU partitions associated with T1 partition object definition 630-1. VCM 337 also assigns T1 object 640-1 to SP 420 because that SP is connected to ALU 446 hosting the respective LU partitions for object 640-1. Further, VCM 337 may assign T1 object 650-1 to SP 430 because that SP is connected to ALU 448 hosting the LU partition for object 650-1. At this stage of initialization, each of the distributed T1 objects may not include any references to other objects, such as their parent T2 object definitions. Further, as the T1 objects are distribute to the appropriate VSMs included in the target T1 SPs, the VSM instantiates the T1 objects as a stacked driver model. Thus, T1 objects that are configured in a hierarchical format, are instantiated according to their assignment in the hierarchy (i.e., sibling T1 objects may be instantiated before parent T1 objects and the root T1 object in a T1 object sub-tree.

It also should be noted that in so much as the T1 objects themselves have hierarchical configurations, all T1 objects in these configuration are also distributed. For example, T1 object 620-1 may be a root object for sibling T1 objects, such as a snapshot object of partition objects, forming a T1 sub-tree. In this situation, T1 object 620-1 and its sibling T1 objects in the T1 sub tree are also distributed by VSM 337 during Step 522. Further it should be noted that any T1 objects associated with each other through an ALU's partitioning configuration, such as T1 partition objects 620-1 to 620-4, are assigned and distributed to the same T1 SP.

Figure 7A:
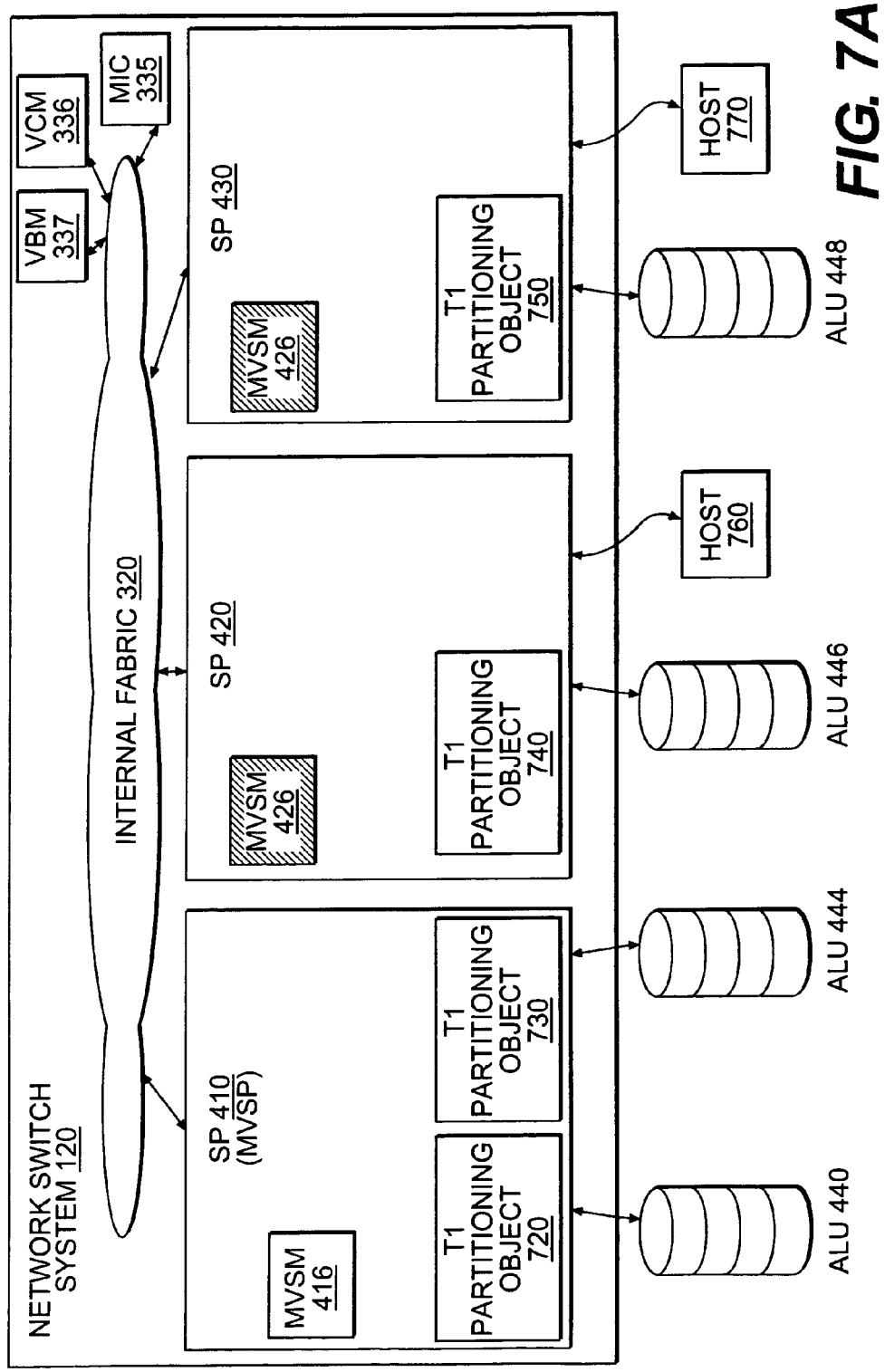
FIGS. 7A and 7B are block diagrams of mappings for a distributed virtual volume consistent with certain embodiments of the present invention.

FIG. 7A is a block diagram of network switch system 120 including a virtual volume map having T1 objects distributed by VCM 337 corresponding to the tree configured by MVSM 416. As shown, VCM 337 initially distributes T1 partitioning objects 720, 730, 740, and 750 to SPs 410, 420, and 430, respectively, based on the connectivity between SPs 410-430 and ALUs 440-448.

Once VCM 337 distributes the T1 objects (e.g., T1-subtrees), it requests the volume location structure information from MIC 335 (Step 524). In this process, MIC 335 access the memory device storing the physical connection information indicating which virtual volumes are to be seen by hosts 110-1 to 110-N. The volume location structure information identifies which SPs need to expose the volume being created and thus identifies which T2 SPs are to receive the T2 objects. MIC 335 collects and sends the volume location structure information to VCM 337.

VCM 337 uses the volume location structure to identify which SPs are to receive the T2 objects. Accordingly, VCM 337 may set up logical connections for each T1 and T2 layer object relationship defined by MVSM 416 in the configured tree. This process may include building iSCSI logical connections between the T1 objects and the locations where the T2 objects will be placed by VCM 337. It should be noted that embodiments of the present invention are not limited to iSCSI technologies when configuring the logical connections between T1 and T2 layer objects, and any type of technology and methodology may be implemented to determine which SPs are to receive T2 objects.

VCM 337 then requests the exposure of the T1 objects to appropriate ones of the T2 SPs (Step 526). Accordingly, those T1 SPs that received a T1 object perform configuration processes that enable selected T2 SPs identified in the volume location structure information to identify the T1 SPs hosting the T1 objects. These processes allow each second tier SP assigned a T2 object related to a corresponding T1 object to discover that T1 object that is created based on the exposure request and the appropriate T1 objects instantiated by corresponding T1 SP VSMs. In other words, a first T1 SPs exposes its T1 objects only to those T2 SPs that have a T2 object that is related to these T1 objects. For example, during the exposure process, VCM 337 directs SP 410 to expose its T1 objects to the other T2 SPs having T2 objects related to T1 objects 720 and 730, shown in FIG. 7A (e.g., SPs 420 and 430). Also, VCM 337 directs SP 420 to expose its T1 objects (e.g., T1 partitioning object 740) to SPs 410 and 430, and SP 430 to expose its T1 objects (e.g., T1 partitioning object 750) to SPs 410 and 420. Once exposed, discovery of these T1 objects may be performed using a reports LUNs command that directs each SP to report the WWNs of any LUs that are assigned to any attached ALUs. For example, SP 410 may report the WWNs for any LUs assigned to ALUs 440 and 444 and associated with T1 objects 720 and 730.

VCM 337 sets up iSCSI logical connections between proposed T2 to T1 object access paths to enable a T2 SP hosting a T2 object definition to gain access to its sibling T1 object. To establish the logical references and handles from the T2 objects to the appropriate exposed T1 objects, VCM 337 directs each T2 SP hosting a T2 object to discover the SPs hosting any T1 objects (Step 528). VCM 337 also directs the other SPs (e.g., 420 and 430) to discover any appropriate exposed T1 virtual volume objects. For example, SP 420 may discover that SP 410 is exposing T1 objects 720 and 730 through iSCSI commands that enable it to collects the WWNs associated with these objects.

Once this information is discovered by SP 420 (and the remaining SPs in the network switch system 120 associated with the virtual volume) VCM 337 distributes the appropriate T2 objects on top of the discovered T1 objects, such that references and handles to the first tier objects are defined in the T2 objects (Step 530). VCM 337 distributes the T2 layer objects to the VSMs of the appropriate T2 SPs that have host access connections. VCM 337 may configure and distribute the T2 layer objects with logical nodes for local T1 layer object references and remote T1 layer object references. Each of these references includes full definitions of the root node of the T2 layer sub-tree and parent/sibling pointers. For example, T2 mirroring object 710 is distributed to SP 420 and may include definition data for T2 striping node 705 (i.e., root of the T2 sub tree) and pointers to T2 mirroring object 715 and striping node 705. As the T2 objects are distributed to the appropriate VSMs included in the target T2 SPs, the VSM instantiates the T2 objects as a stacked driver model. Thus, T2 objects that are configured in a hierarchical format, are instantiated according to their assignment in the hierarchy (i.e., sibling T2 objects may be instantiated before parent T2 objects and the root T1 object in a T2 object sub-tree.

Figure 7B:
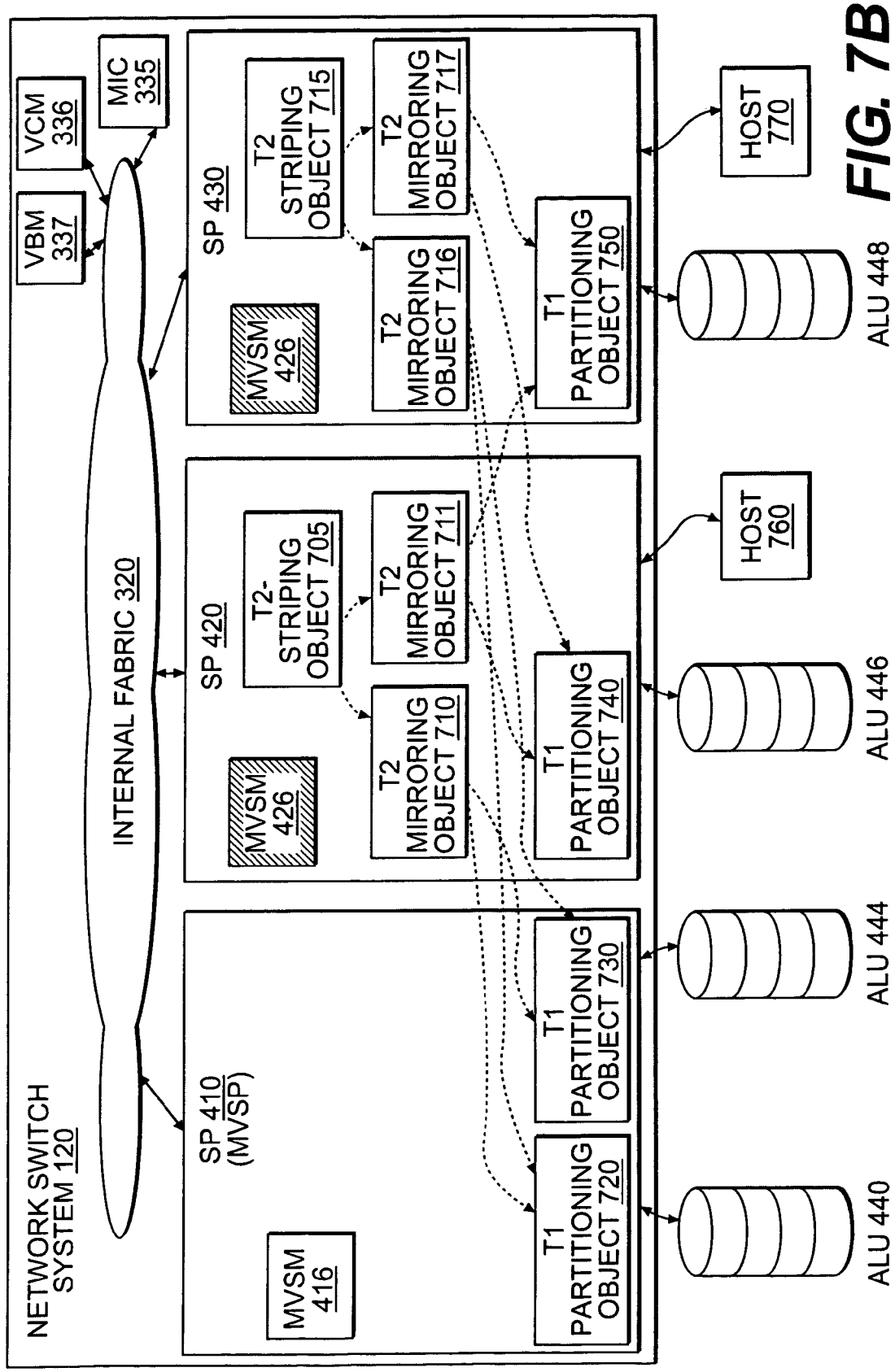

FIG. 7B is a block diagram of network switch system 120 including a virtual volume map including the T2 and T1 objects distributed by VCM 337 corresponding to the tree configured by MVSM 416. As shown, VCM 337 distributes two T2 striping objects 705 and 715 to SPs 420 and 430, respectively, based on the connectivity between SPs 420, 430 and hosts 760 and 770. Further, VCM 337 maps the mirroring portion of the striping over mirroring type volume configuration by assigning T2 mirroring objects 710 and 711 to SP 420 and T2 mirroring objects 716 and 717 to SP 430. T2 mirroring objects 716 and 717 reflect the mirrored copies of T2 mirroring objects 710 and 711, respectively. As shown in FIG. 7B, VCM 337 also establishes the references from each of the T2 layer objects. These references are shown in FIG. 7B as dotted lines flowing from T2 objects 705-717 to sibling objects (e.g., T1 or T2 objects) 710-750. For example, T1 partitioning object 720 has multiple references from mirrored copies T2 mirroring objects 710 and 716. Accordingly, VCM 337 creates a system definition view of the virtual volume object mappings that are used by network switch system 120 for managing the configured virtual volume created by MVSM 416.

Additionally, each T2 object that is distributed by VCM 337 includes a local reference node including reference information to a T1 object that is assigned to the same SP receiving the T2 object. Further, a T2 object may include a remote reference node including reference information to a T1 object assigned to a remote SP different from the SP receiving the T2 object. The reference nodes includes full definitions of a root object of the T2 sub tree and includes pointers to any sibling T2 objects.

Further, each SP connected to an ALU may be configured with redundant communication paths. Accordingly, VCM 337 also establishes which of these redundant communication paths extending from an ALU to a corresponding T1 object hosting SP is active and inactive (Step 532).

As explained above, VCM 337 distributes all T1 layer objects to the appropriate SPs, and then distributes the T2 layer nodes with the appropriate references and pointers to the T1 and related T2 layer objects. Accordingly, embodiments of the invention create first and second virtualization layers associated with the components of network switch system 120. For example, those SPs assigned T1 objects are identified with a first virtualization layer, while those SPs assigned T2 objects are identified with a second virtualization layer. SPs assigned both T1 and T2 objects are identified with the first virtualization layer. Thus, network switch system 120 logical represents virtual volumes through a two-tier architecture including first tier components (e.g., first tier SPs) and second tier components (e.g., second tier SPs). During runtime operations, SPs may be dynamically reassigned between the two virtualization layers based on their communication path connections with one or more hosts and/or ALUs.

Once a VSM has received all of the object definitions and communication path information from VCM 337, it may initialize its volume in an offline state; meaning access the virtual volume portion managed by the VSM is created but is inaccessible by a host (Step 534). As explained, the T1 and T2 objects are instantiated as stacked driver models. Accordingly, when a VSM initializes a virtual volume defined by its respective VSMDB's virtual volume objects, it uses the instances of each driver in the stack that were instantiated during the T1 and T2 distribution operations. For example, consider a virtual volume tree including a concatenation object on top of a snap copy object, which is further defined on top of a partition object that references an ALU device discovered by a target VSM of an SP connected to the ALU device. Based on this tree configuration, the VSM first creates an instance of a partition driver referencing the ALU device discovered by an SCSI driver operating as an underlying device for system 120. The target VSM also creates an instance of a snapshot driver referencing the instantiated partition device. The target VSM then creates an instance of a concatenation driver referencing the snap shot device. based on the created instances, the VSM may initialize its portion of the virtual volume. When the entire tree is initialized in all other applicable VSMs of system 120, the target VSM provides a SCSI server with a handle to the root driver (e.g., in this example, the concatenation driver) and places the host SP in an offline state.

Each VSM then notifies VCM 337 of the successful initialization (Step 536). Upon receiving the notifications, VCM 337 establishes communications with each SP having a VSM that successfully initialized their portions of the virtual volume.

VCM 337 then determines whether the virtual volume being initialized has been successfully configured (Step 538). If not (Step 538; NO), a failure message may be generated and reported to MIC 335 and network switch system 120 leaves the unconfigured virtual volume in an offline state (Step 539). In one embodiment, MIC 335 provides an error message to a user of the host 110-110-N associated with the unconfigured virtual volume.

On the other hand, if the virtual volume has been successfully configured (Step 538; YES), network switch system 120 determines whether any additional virtual volume are remaining to be configured (Step 540). If there more volumes (Step 540; YES), network switch system 120 then determines whether these volumes have been successful configured (Step 538), thus ensuring only configured virtual volumes are available for access, while unconfigured volumes are unavailable. When there are no more virtual volume for network switch system 120 to evaluate (Step 540; NO), VCM 337 creates and sends a notification message to each SP (e.g., 410-430) that directs these processors to transition their respective volumes to an online state (Step 542). Once the SPs are all online, the virtual volume set up by MVSM 416 and mapped by VCM 337 may be accessed by a host 110-1 to 110-N connected to system 120.

V. CREATING A VIRTUAL VOLUME

Figure 8A:
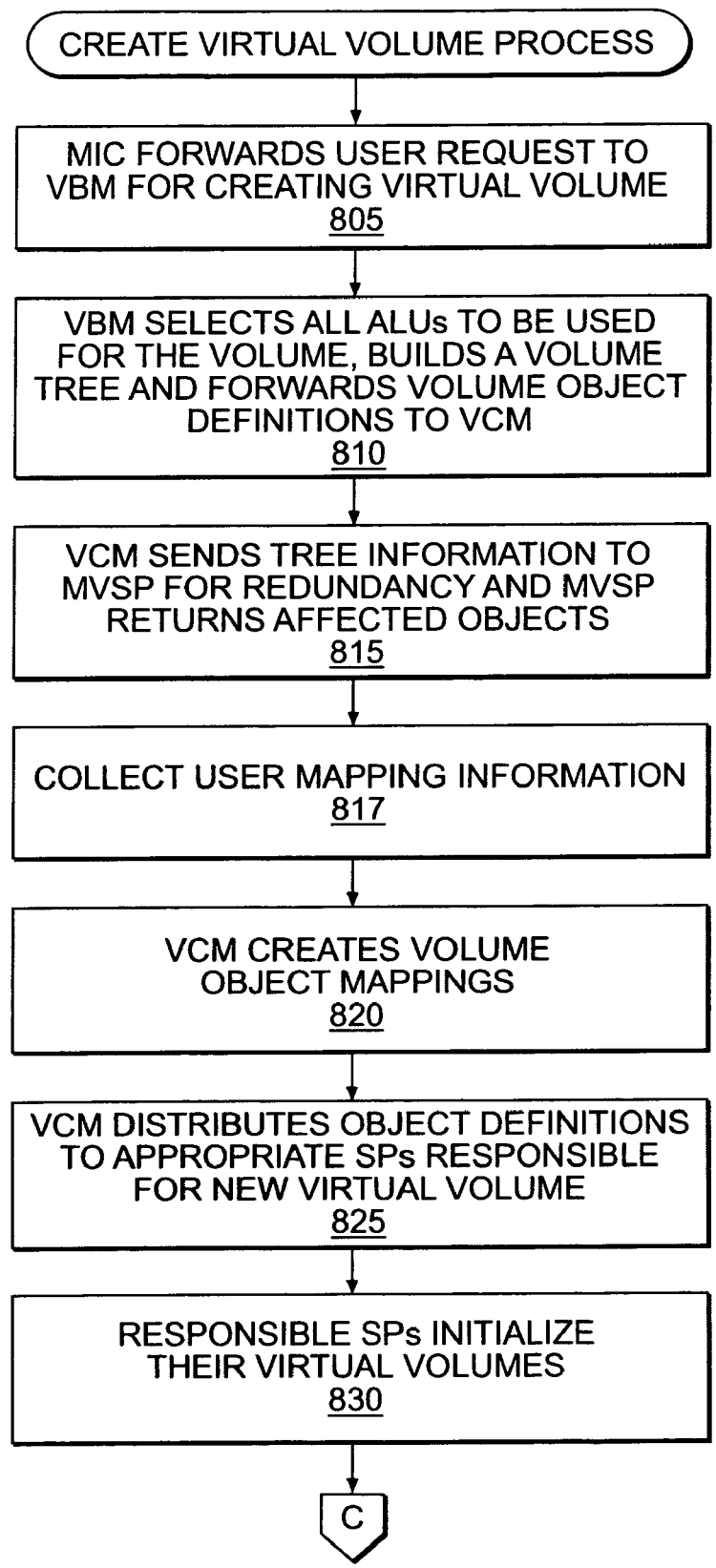
FIGS. 8A and 8B are flowcharts of a virtual volume creation process consistent with certain embodiments of the present invention.
Figure 8B:
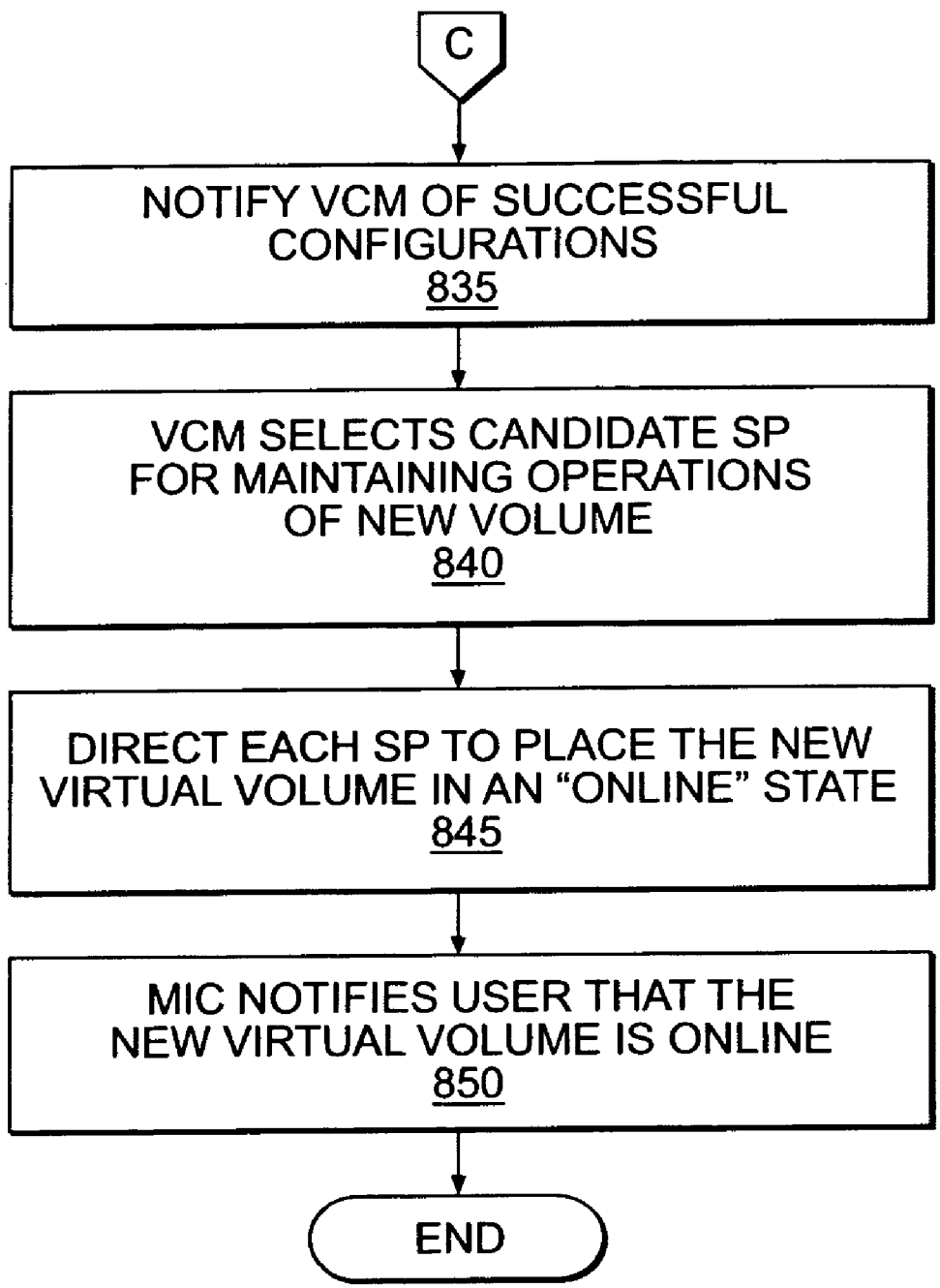

A user operating a host 110-1 to 110-N may create a virtual volume by leveraging the functionalities of network switch system 120. FIGS. 8A and 8B are flowcharts of a virtual volume creation process performed by system 120 for configuring and activating a virtual volume based on user defined specifications.

Initially, a user operating a host 110-1 to 110-N may access network switch system 120 through the interface software executed by MIC 335. This software allows the user to set up a customized virtual volume based on one or more parameters associated with the type of information and storage requirements set by the user. For example, the user may request a particular type of virtual volume, such as different data protection levels (i.e., striping, mirroring, striping over mirroring, etc.). Further, the user may specify a number of storage resource devices, storage arrays, disks, etc. that should be used to make up the new virtual volume. Also, the user may specify devices that should be used in configuring and maintaining the volume, such as individual storage devices or a pool of devices. Alternatively, the user may request that the system 120 automatically configure a virtual volume based on certain space requirements designated by the user. The user leverages the interface software of MIC 335 to provide the virtual volume request (including any designated parameters) to MIC 335.

Once received, MIC 335 may forward the user request to VBM 338 (Step 805). VBM 338 determines which of the ALUs currently operating with network switch system 120 are to be used for the volume. In one embodiment, VBM 338 accesses a list of available extents associated with the storage devices 130-1 to 130-D. Based on the available storage space reflected in the list, VBM 338 selects appropriate extents for creating the virtual volume requested by the user.

In one embodiment, VBM 338 selects the ALUs for the volume based on an algorithm that considers the number of ALUs hosting the volume (e.g., the virtual volume may be limited to spanning a certain number of ALUs). Further, the algorithm may take a round robin approach in placing data on different ALUs to obtain better performance for network system switch 120. Alternatively, VBM 338 may consider Quality of Service attributes of storage devices (e.g., performance, latency, availability) as they are allocated to match the requirements of the volume that is being created. The above examples are not intended to be limiting and other methods and technologies may be implemented by system 120 to assist in determining which SPs are to be used for a volume under creation.

Based on the determined ALUs and the parameters included in the request, VBM 338 builds a virtual volume tree. In one embodiment, VBM 338 builds the virtual volume tree in a manner consistent with the volume tree creation processes performed by MVSM 416 described above in connection with Step 516 of FIG. 5B. For example, if the user requests a virtual volume to have striping over mirroring attributes, VBM 338 may determine T1 and T2 objects based on the attributes, and the available extents discovered from the available extent list. Thus, VBM 338 may determine T1 and T2 object definitions associated with the type of virtual volume reflected in the user request to generate a virtual volume tree, such as a tree similar to that shown in FIG. 6. It should be noted that any type of virtual volume tree configuration may be generated by VBM 338 and is not intended to be limited to a configuration such as the virtual volume tree 600 depicted in FIG. 6 It should also be noted that both a MVSM and VBM 338 build virtual volume trees not cognizant of where a T2/T1 tier line may be subsequently determined later VCM 337. That is, VBM 338 may build a virtual volume tree based on the needed virtualization transforms, while an MVSM may build a virtual volume tree based on the object associations found on disk (i.e., the ALUs connected to network switch system 120) by the MVSM.

VBM 338 then forwards the created tree information to VCM 337 (Step 810). In one embodiment, VCM 337 forwards the volume tree information to the designated MVSP (e.g., SP 410), where the information is persistently stored in a memory location. The MVSP then sends to VCM 337 an acknowledgement that the tree information is stored. Further, the MVSP returns to VCM 337 the newly stored tree along with any affected objects (e.g., ALUs) based on the tree (Step 815). In one embodiment, the MVSP only returns information associated with those virtual volume objects that require modification based on the volume tree configured by VBM 338 and sent by VCM 337.

Once the virtual volume is stored in memory by the MVSP, the create virtual volume process may also include collecting user mapping information identifying which hosts are to be affiliated with certain virtual volumes (Step 817). The user mapping information may have been previously requested by MIC 335, stored and/or provided to VCM 337. Alternatively, VCM 337 may instruct MIC 335 to collected this information from the user.

Using the tree information received from VBM 338, VCM 337 maps the virtual volume objects to the appropriate SPs in system 120 based on the configured tree and current system image information provided by the MVSP (Step 820). VCM 337 maps the objects in a manner consistent with the processes described above in connection with Step 522 of FIG. 5B. For example, VCM 337 may set up iSCSI links between SPs 410-430 and issue iSCSI commands to have each SP report the LUs that are exposed to the other SPs. SP 420 may issue a report LUNs command over the iSCSI links to allow SP 410 to report any LUs associated with objects 720 and 730. SP 410 may report these LUs by providing the WWN of these LUs to SP 420 enabling SP 420 to generate references to the T1 objects 720 and 730 for accessing their corresponding LUs stored in ALUs 440 and 444.

VCM 337 then distributes the objects to the appropriate SPs based on the mappings (Step 825). VCM 337 distributes the objects in a manner similar to the distribution processes performed during the initialization sequences described above in connection with Steps 522-530 of FIG. 5B. For example, VCM 337 distributes the T1 objects to those SPs having connections to ALUs associated with the T1 objects, collects volume location structure information from MIC 335, requests exposure and discovery of the T1 objects, and then distributes the T2 objects to the appropriate T2 SPs based on the mappings configured by VCM 337.

Each SP that receives its appropriate objects from VCM 337 configures a respective portion of the new virtual volume in an off-line state (Step 830). Each SP then notifies VCM 337 of a successful configuration of its portion of the new virtual volume (Step 835). Once VCM 337 receives successful configuration indications from those SPs with updated objects corresponding to the new virtual volume, it selects an SP to maintain operations of the new virtual volume (Step 840). VCM 337 also sends an instruction to the VSM for each of the SPs associated with the new virtual volume to place the new volume in an online state (Step 845). Once online, VCM 337 sends MIC 335 a message indicating that the new virtual volume is available which prompts MIC 335 to notify the user that the new virtual volume is online (Step 850).

As noted previously, each SP in system 120 may include multiple fibre channel ports that expose virtual volume objects to the devices connected to these ports. For example, SP 420 may include a fibre channel port connected to ALU 446- and another port connected to host 760. The virtual volume exposed to host 760 is not exposed to ALU 446, or any device connected to that port. Further, the port connected to host 760 is associated with the T2 objects defined for that particular SP (i.e., objects 705, 710, and 711), while the T1 object 740 is associated with the port connected to ALU 446.

VI. DYNAMICALLY CONFIGURING A VIRTUAL VOLUME

As explained above, network switch system 120 configures and manages virtual volumes for hosts 110-1 to 110-N. Embodiments of the invention also enable network 120 to dynamically configure established virtual volumes during runtime operations. In one embodiment, a user operating a host 110-1 to 110-N may request modification or reconfiguration of a virtual volume through MIC 335. These changes may require system 120 to add new T1 and/or T2 sub tree objects to the virtual volume, move objects between SPs in a virtual volume, and/or remove these types of objects from a virtual volume. FIGS. 9A-9D are block diagrams describing reconfiguration processes performed by network switch system 120 during runtime operations.

A. Adding Virtual Volume Objects

Figure 9A:
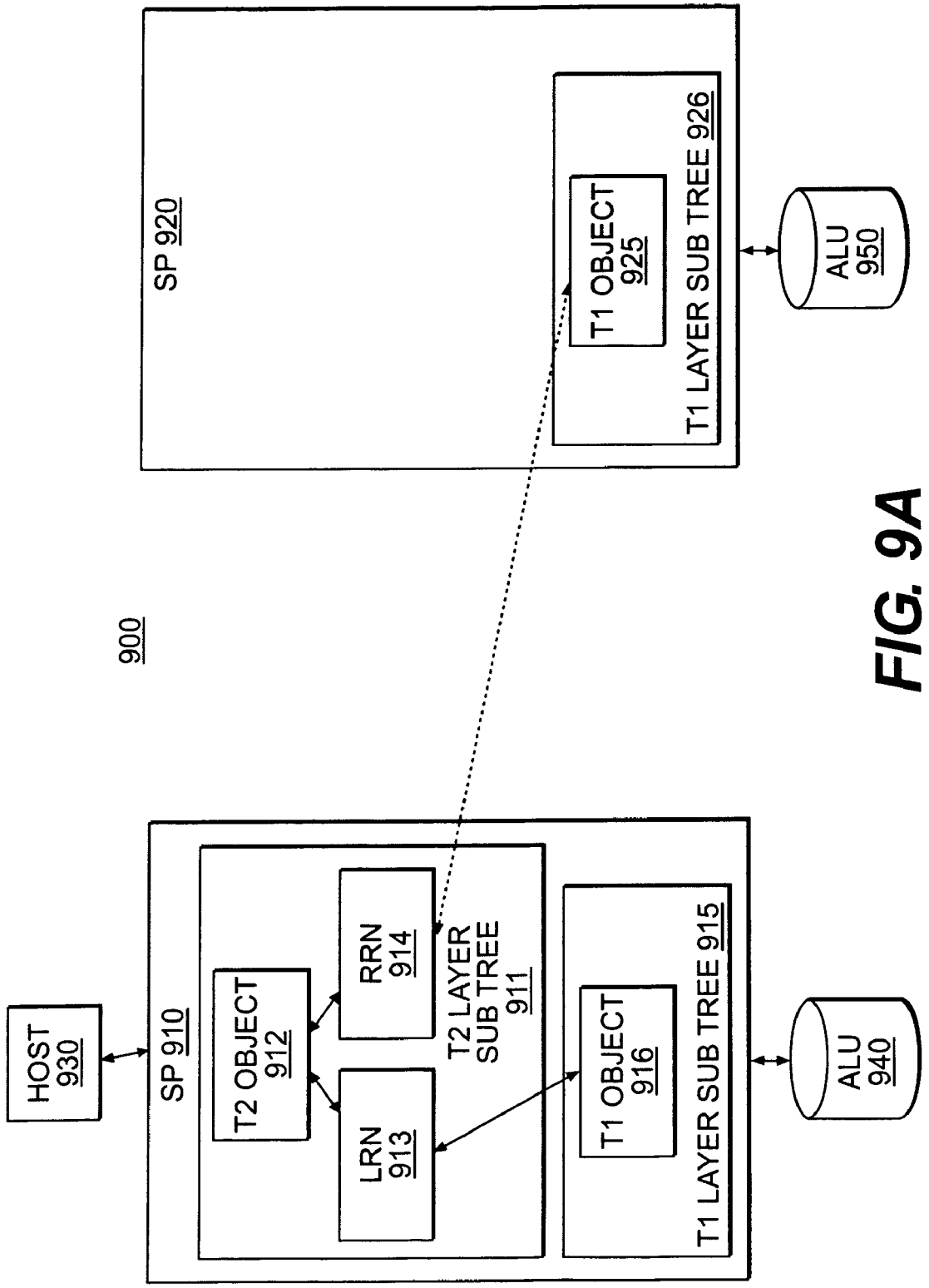
FIGS. 9A-9D are block diagrams of various virtual volume mapping distributions consistent with certain embodiments of the present invention.

FIG. 9A is a block diagram of a virtual volume 900 previously configured by network switch system 120. Volume 900 is distributed among two SPs 910 and 920, with SP 910 having communication paths to host 930 and ALU 940 and SP 920 having a communication path to ALU 950. In accordance with the two-tier storage virtualization aspects of the invention, SP 910 includes a T2 layer sub tree 911 and a T1 layer sub tree 915. T2 layer sub tree 911 includes a root T2 object 912 with a Local Reference Node (LRN) 913 referencing local T1 object 916 and a Remote Reference Node (RRN) 914 referencing a remote T1 object 925 in a remote T1 sub tree 926 assigned to SP 920. Note that because SP 910 has access to host 930, the T2 layer objects are assigned only to SP 910 for this virtual volume. Further, because SP 910 has access to ALU 940, that ALU includes LUs associated with T1 layer sub tree 915. Along the same lines, because SP 920 has access to ALU 950, that ALU includes LUs associated with T1 object 925.

During runtime operations, a user may request a change to the user volume associated with virtual volume 900, such as requesting additional storage space for new data, reconfiguring data alignments (e.g., mirroring data), request snapshots, etc. In such instances, MIC 335 may forward the request to VBM 338 for restructuring the tree associated with virtual volume 900. VBM 338 then forwards the new tree definitions to VCM 337 for mapping. In this instance, the new tree configuration may require adding a new instance of T2 object sub tree to SP 920 based on a request to expose the volume to 930 through another interface port. VCM 337 distributes the object definitions based on the newly added T2 object sub-tree to SPs 910 and 920.

Figure 9B:
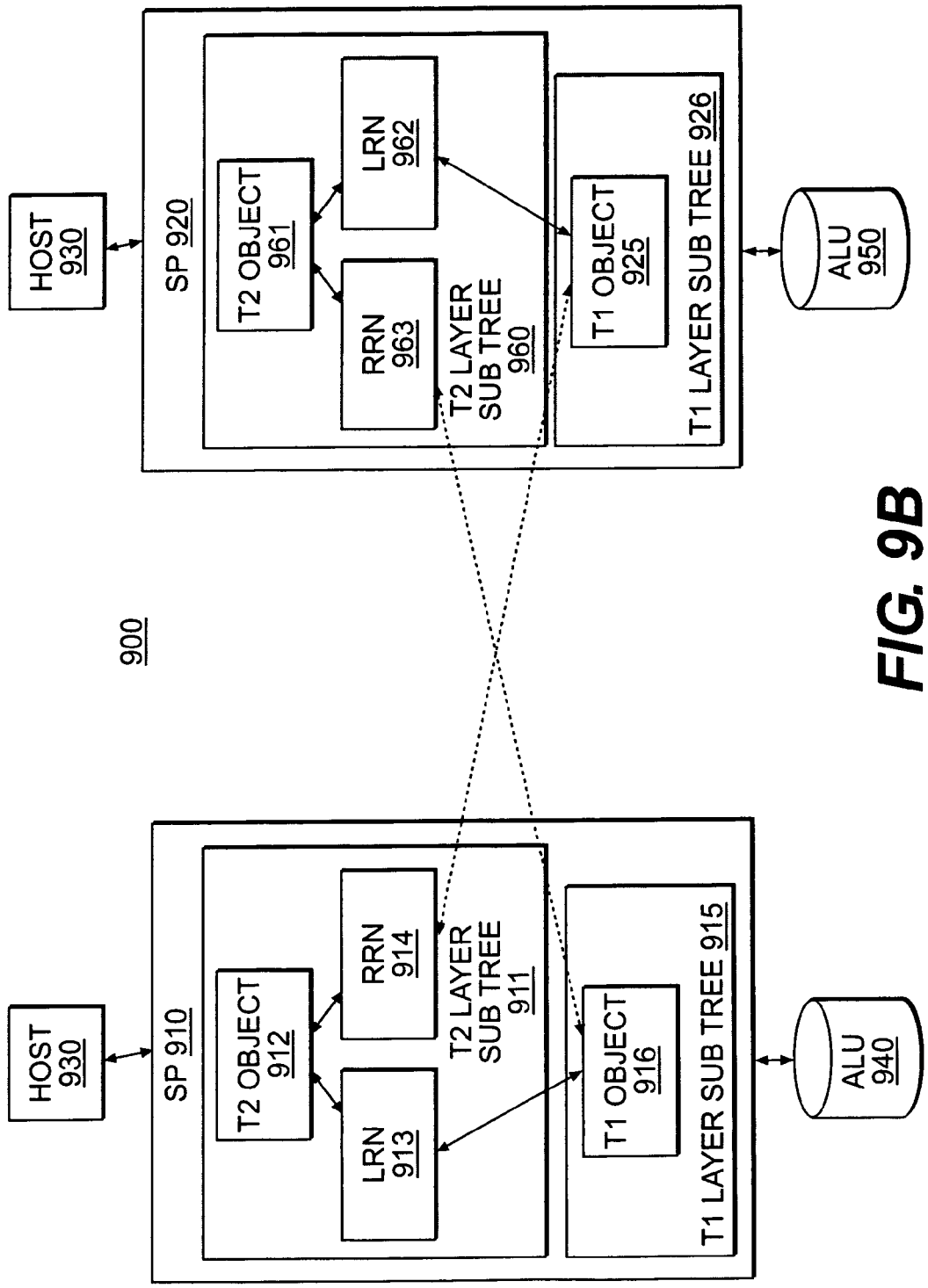

FIG. 9B is a block diagram of virtual volume 900 describing the new distributions. During the distribution processes, VCM 337 passes a new T2 layer sub-tree instance 960 to SP 920 including a root T2 object 961, a T1 LRN 962 referencing local T1 object 925 (local to SP 920), and a T1 RRN 963 referencing remote T1 object 916 (remote to SP 920). VCM 337 places the complete node definition for the root node of T1 layer sub tree 915 in T1 RRN 963.

B. Moving Virtual Volume Objects

Network switch system 120 may also be configured to move an existing T1 or T2 object from one SP to another based on a user request to adjust a virtual volume. For example, consider the situation where VSM 337 creates a virtual volume map that requires T1 object 925 as shown in FIG. 9A to be moved from SP 920 to SP 910.

Figure 9C:
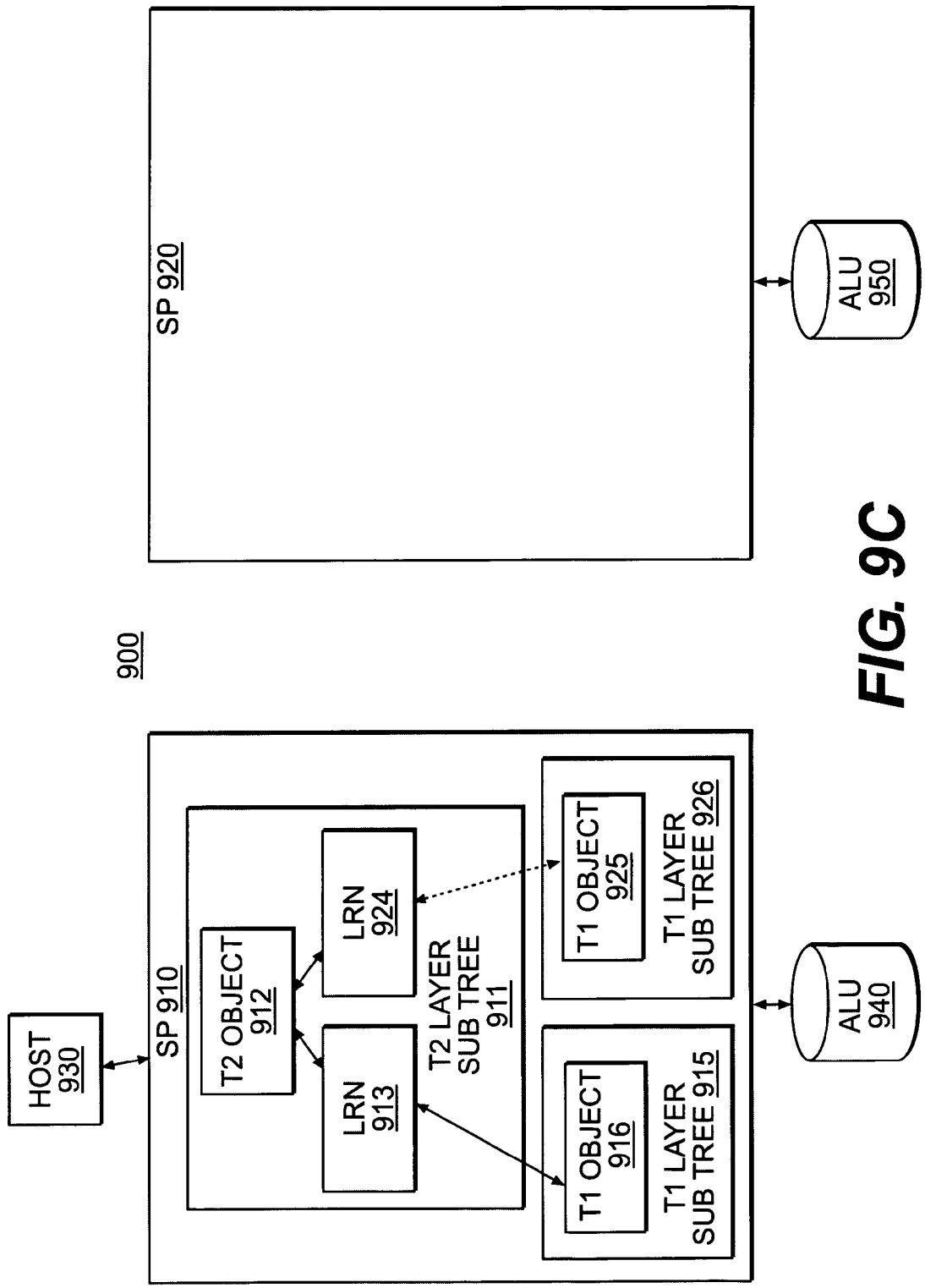

FIG. 9C is a block diagram of virtual volume 900 following the moving of T1 object 925 to SP 910. Initially, prior to moving T1 object 925, network switch system 120 sends new T2 sub trees reflecting the new mappings created by VSM 337 to the appropriate SPs (e.g., SP 910). The distributed T2 sub tree has null pointers to LRN 913 and RRN 914 to prepare T2 sub tree 911 for temporarily removing T1 subtrees 916 and 925 and also allows the VSM for SP 910 to remove the references to an operating system handle (OSH) and ALU handles (e.g., dev_t handle) associated with ALUs 940 and 950.

VCM 337 then sends a configured T1 tree to SP 910 that removes T1 sub tree 915 and RRN 914 reference remote T1 object 925. In one embodiment, a shutdown action code associated with T1 sub tree 915 is provided in the distributed T1 tree that directs SP 910 to remove T1 sub tree 915. Also, a delete action code for RRN 914 is provided by VCM 337 that removes RRN 914. It should be noted, that if there were additional SPs in virtual volume 900 that required T1 object adjustments, VCM 337 would send similar T1 trees to these SPs as well. Once T1 sub tree 915 is shutdown, VCM 337 sends the new T1 tree with the new mappings (i.e., T1 sub trees 915 and 926 assigned to SP 910) to SP 910. Following that distribution, VCM 337 then sends the T2 sub trees to SP 910 with LRN 913 referencing T1 object 916 and a new LRN 924 referencing T1 object 925, which is now local to SP 910. SP 910 is now available to handle volume requests from host 930 associated with data corresponding to T1 object 925. It should be noted that because SP 920 now has no connection with a host, there are no T2 objects assigned to SP 920. Also, since T1 object 925 is assigned to SP 910, ALU 940 now stores any LUs associated with that first tier object.

C. Removing Virtual Volume Objects

In addition to adding and moving virtualization objects within a virtual volume, network switch system 120 may also delete objects. For example, consider the situation where VCM 337 configures a virtual object map that requires removing T2 sub tree 911 shown in FIG. 9B from SP 910.

Figure 9D:
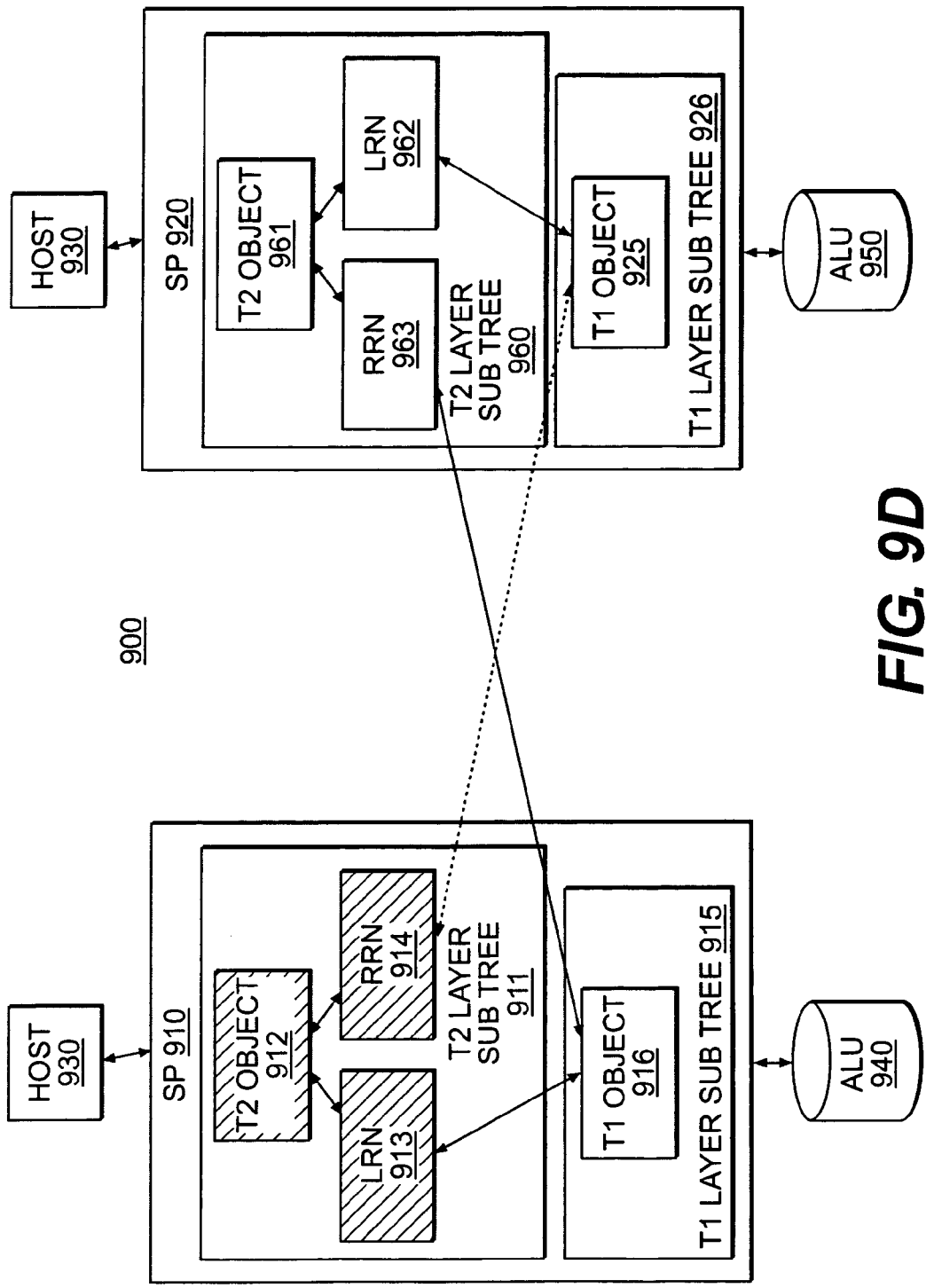

FIG. 9D is a block diagram describing the results of such a removal process. Initially, to prevent situations where a user may request data from an ALU attached to an SP that is a target of an object removal process, VCM 337 may send instructions that direct the target SP to temporarily ignore commands associated with such access requests initiated through MIC 335. For example, in accordance with the exemplary configuration shown in FIG. 9D, SP 910 may be instructed to disable its LUN mappings, thus causing SP 910 to not accept volume requests originating from host 930. In response, host 930 may receive error messages indicating that any requested objects associated with SP 910 are no longer available.

Once SP 910 disables its LUN mappings, VCM 337 distributes a copy of T2 sub tree 911 with a delete action code for all associated T2 reference nodes (e.g., LRN 913 and RRN 914). Further, VCM 337 marks T1 RRN 913 with a refresh action code and nullifies any sibling and parent pointers defined in RRN 913. This eliminates any references from T2 sub tree 911 to any T1 objects (e.g., T1 object 916), and thus removes T2 sub tree 911 from SP 910 (illustrated in FIG. 9D as crossed out objects 912-914). T1 object 916 remains assigned to SP 910 because ALU 940 maintains LUs associated with that first tier object. Further, T2 sub tree 960 still references T1 object 916 through RRN 963, as shown in FIG. 9D.

Accordingly, VCM 337 may remove objects from a virtual volume by removing any designated T2 objects associated with the removal operation and then removing any T1 objects having no remaining T2 references following the removal of the designated T2 objects.

VII. MULTI-PATH NETWORK SWITCH SYSTEM

A. Overview

As explained above, network switch system 120 manages multiple virtual volumes for many different hosts 110-1 to 110-N. To ensure the consistency and availability of these volumes and the operations of the storage virtualization aspects of the invention, system 120 uses a symmetric (i.e., equal access through all communication paths) architecture that does not require specific commands from a host multi-path driver. The storage resource devices (e.g., devices 130-1 to 130-D) may use symmetric or asymmetric access models that network 120 handles in a manner transparent to hosts 110-1 to 110-N. Also, system 120 provides host access to virtual volumes through any port configured to access a storage device storing data associated with these volumes. Embodiments of the invention allow system 120 to provide various multi-path abstraction models through the integration of asymmetric or symmetric multi-path models associated with storage devices 130-1 to 130-D in conjunction with the high-speed internal switching architecture of system 120.

Figure 10:
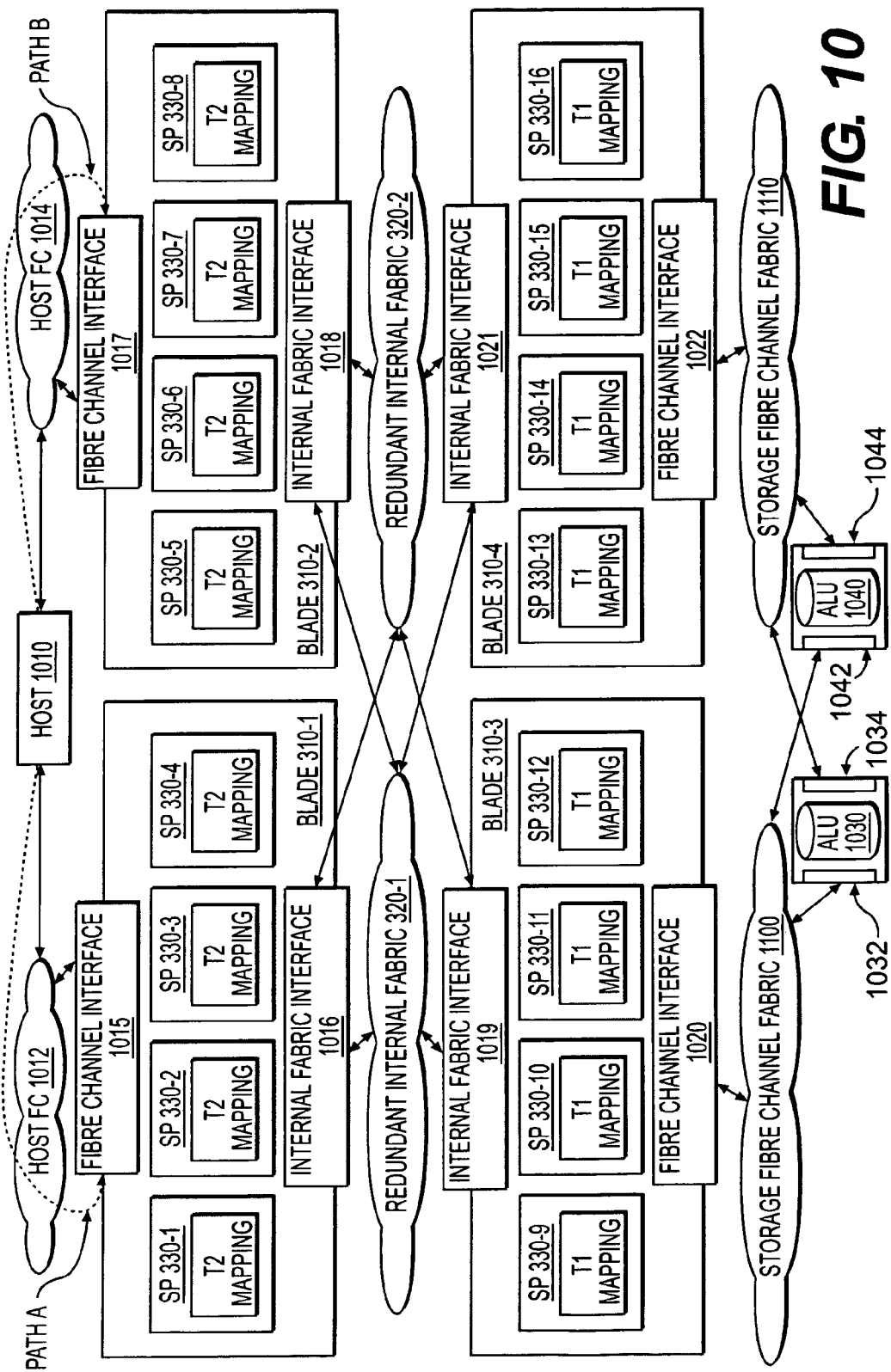
FIG. 10 is a block diagram of a multi-path network switch system configuration consistent with certain embodiments of the present invention.

FIG. 10 is a block diagram of a multi-path configuration implemented by system 120 to provide fault tolerant capabilities during storage virtualization operations. As shown, system 120 includes a number of blades 310-1 to 310-4, each including a number of SPs (e.g., 330-1 to 330-16). In this exemplary configuration, some SPs in system 120 include virtualization mapping definitions distributed by VCM 336 (not shown). For example, SPs 330-1 to 330-6 each include T2 sub trees (e.g., T2 mapping) that reflects the access capabilities between SPs 330-1 to 330-8 and host 1010. SPs 330-1 to 330-4 are connected to host 1010 through a fibre channel interface 1015 and a host fibre channel fabric 1012. SPs 330-5 to 330-8 are connected to host 1010 through a fibre channel interface 1017 and host fibre channel fabric 1014. Further, SPs 330-1 to 330-8 are connected to corresponding internal fabrics 320-1 and 320-2 through respective internal fabric interfaces 1016 and 1018.

It should be noted that fibre channel interfaces 1015 and 1017 include a number of ports that are dedicated to certain SPs. For example, interface 1015 may include two ports attached to SP 330-1, two ports attached to SP 330-1, two ports attached to SP 330-3, and two ports attached to SP 330-4. One of the redundant ports is activated to allow communications between interface 1015 and a selected SP 330-1, with the other corresponding port being available for backup communication purposes. Interface 1017 is similarly configures with redundant ports attached to respective ones of SPs 330-5 to 330-8.

SPs 330-9 to 330-16 are also connected to respective internal fabrics 320-1 to 320-2 through internal fabric interfaces 1019 and 1021. As shown in FIG. 10, SPs 330-9 to 330-16 include first tier virtualization object mappings (e.g., T1 mappings) that are distributed by VCM 336 (not shown) based on their connection to ALUs 1030 and 1040. SPs 330-9 to 330-12 are connected to ALU 330 through fibre channel interface 1020 and storage fibre channel fabric 1100, while SPs 330-13-330-16 are connected to ALU 1040 through fibre channel interface 1022 and storage fibre channel fabric 1110. ALUs 1030 and 1040 may include access ports connected to a processing component that hosts these ALUs. For example, ALU 1030 may have an storage port controller 1032 that facilitates communication with storage fibre channel fabric 1100 and another storage port controller 1034 that facilitates access to storage fibre channel fabric 1110. Also, ALU 1040 may include similar ports 1042 and 1044 to facilitate access to storage fibre channel fabrics 1100 and 1110, respectively. Similarly with interfaces 1015 and 1017, interfaces 1020 and 1022 are configured with redundant ports attached to respective ones of SPs 330-9 to 330-12 and SPs 330-13 to 330-16, respectively.

ALUs 1030 and 1040 may include or are associated with hardware/software components that leverage asymmetric and symmetric multi-pathing models to facilitate access to data stored by these ALUs. For example, storage port controllers 1032, 1034 and 1042, 1044 are used by ALUs 1030 and 1040, respectively, to facilitate access to virtual volume data maintained by these devices.

In one embodiment, host 1010 includes multi-pathing software that is configured to identify multiple paths to virtual volumes presented by network switch system 120. This software presents the multiple paths as a single device to operating system software executing at host 1010. A multi-pathing driver layer within host 1010 enables the operating system to reconcile a single storage device (e.g., ALU 1030) that is discovered through multiple paths provided by network switch system 120.

Also, the multi-pathing software provides error recovery logic when one of the paths to a storage device fails. When this occurs, the multi-pathing software retries any IO requests with network switch system 120 using an alternate path to a virtual volume provided by switch system 120. Additionally, the recovery logic provides fault tolerance in the event a hardware fault occurs, such as the failure of a host bus adapter, cable, switch port, switch fibre channel port card, or network port card.

Moreover, the multi-pathing software performs load balancing processes that distribute IO request loads across the multiple paths to system 120. These processes are used by host 1010 and system 120 to eliminate possible bottlenecks that may occur at one or more components of networks witch system 120, such as at a host bus adapter or fibre channel interface.

System 120 integrates the specific multi path management procedures leveraged by ALUs 1030 and 1040 with the multi path functionalities provided by the components of switch system 120. Accordingly, system 120 manages storage devices (e.g., ALUs 1030 and 1040) that use the asymmetric and symmetric multi path models while presenting a symmetric host multi path model to host 1010. Further, network switch system 120 supports host driver multi-pathing industry models, such as Veritas DMP (symmetric mode) and QLogic multi-pathing driver.

System 120 also protects against single point of failures by using redundant internal fabric switches 320-1 and 320-2, LRCs, SRCs (e.g., SRCs hosting each SP 330-1 to 330-16), and fibre channel interfaces 1015, 1017, 1020, and 1022.

Figure 11:
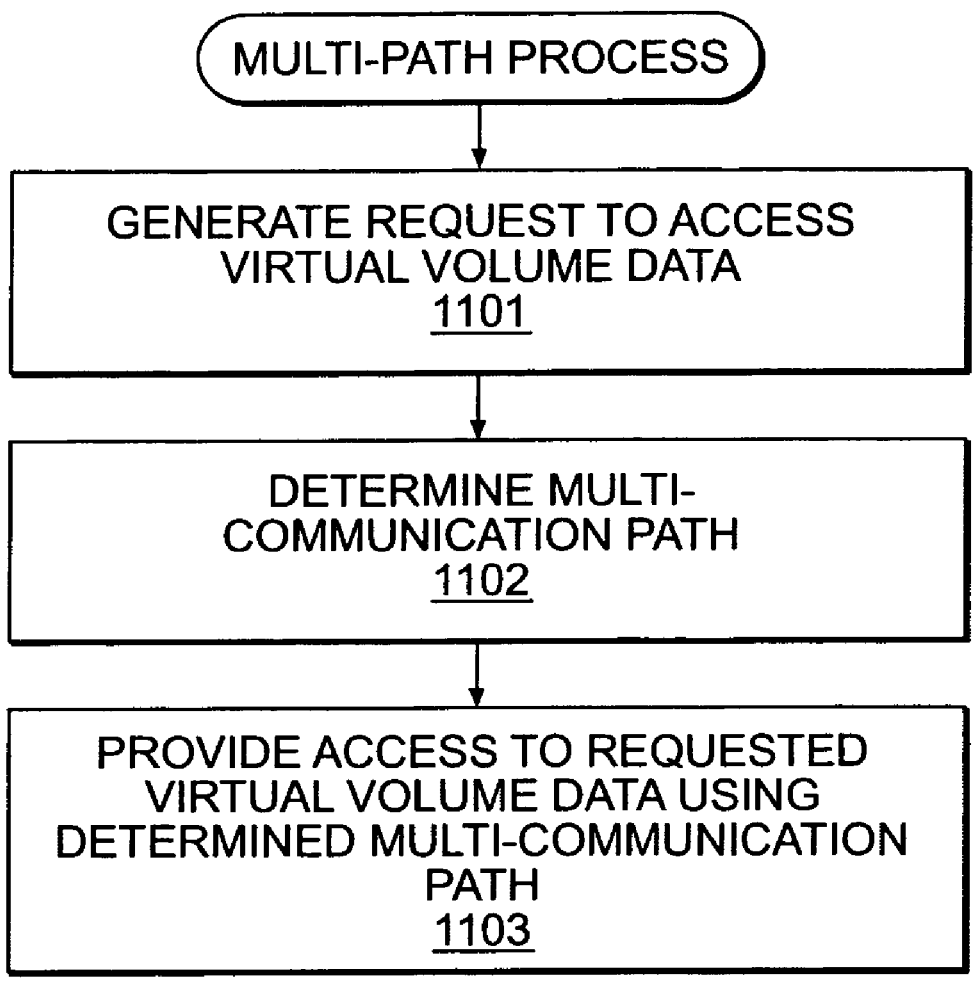
FIG. 11 is a flowchart of a multi-path process consistent with certain embodiments of the present invention.

In one aspect of the invention, system 120 performs one or more multi-path processes for providing access to virtual volume data stored in ALUs 1030 and 1040. FIG. 11 is a flowchart of an multi-path communication process that system 120 performs when providing fault tolerant access to virtual volumes managed by the switch system. Initially, host 1010 may generate a request to access virtual volume data associated with a virtual volume configured and managed by system 120 in a manner consistent with aspects of the invention (Step 1101). The request may be sent through Host FCs 1012 or 1014 depending on the availability of these fabrics or configurations settings for host system 1010 and/or system 120. In response, the system may determine a multi-communication path that traverses selective ones of the fabrics 1010, 1014, 1100, 1110, blades 310-1 to 310-4 (and their corresponding interfaces), and storage port controllers 1032, 1034, 1042, and 1044 (Step 1102). System 120 then provides access to the requested virtual volume data using the determined multi-communication path (Step 1103). During runtime operations, system 120 may dynamically configure the multi-communication path to include different combinations of the above listed components of FIG. 10 to ensure the virtual volume data is available. Thus, for example, if a fabric is inaccessible, system 120 dynamically reconfigures the multi-communication path around the unavailable fabric using the redundant connections between the components of FIG. 10.

Accordingly, network switch system 120 includes and/or leverages redundant components, paths, and/or software to assure the availability of virtual volume data in the event of faults or failures. System 120 may designate specific ones of these components and paths as active or inactive based on their operating state or the global state of system 120. Further, storage port controllers (i.e., ports 1032, 1034, 1042, 1044) may be activated or inactivated by logic associated with ALUs 1030 and 1040 for similar reasons (e.g., failed port, path, etc.) Based on these designations, system 120 processes IO requests from host 1010 using available and active paths and components. The various multi-path operations of system 120 based on different multi path scenarios are described below with reference to FIG. 10. These operations are described in connection with IO requests for virtual volume objects maintained by ALU 1030. However, similar operations may be implemented by switch system 120 to facilitate access to ALU 1040.

B. Storage Port Controller 1032 and Internal Fabric 320-1 Active

In a situation where internal fabric 320-2 is inaccessible, system 120 designates internal fabric 320-1 as active and internal fabric 320-2 as inactive. Host 1010 is configured with two paths to switch 120. The first path, host path A, includes host fibre channel fabric 1012, and blade 310-1 via interface 1015. The second path, host path B, includes fibre channel fabric 1014, and blade 310-2 via interface 1017. In this scenario, system 120 accesses ALU 1030 through an active storage port controller 1032.

When host 1010 provides a virtual volume IO request for ALU 1030 using path A, system 120 routes the request through fibre channel interface 1015, blade 310-1, internal fabric interface 1016, and internal fabric 320-1 to blade 310-3 via internal fabric interface 1019. Blade 310-3 accesses ALU 1030 through fibre channel interface 1020, fibre channel fabric 1100, and storage access port controller 1032.

In the event a component or path failure prevents host 1010 from using fibre channel fabric 1012, it may send the request to access ALU 1030 to system 120 through path B, including fibre channel fabric 1014 and blade 310-2. In this case, system 120 may route the request through blade 310-2 and internal fabric 320-1 to blade 310-3, which accesses ALU 1030 through storage access port controller 1032.

System 120 may also use different paths in this configuration scenario to access ALU 1030 based on the type of components or communication paths that experience faults during runtime operations of the storage virtualization system. For example, system 120 may activate blade 310-4 to receive IO requests from internal fabric 320-1 in the event blade 310-3 cannot receive requests due to some component failure (e.g., internal fabric interface 1019). Blade 310-4 may then access ALU 1030 through fibre channel fabric 1110 and storage port controller 1034. Table I describes the various multi path fail over processes that system 120 may employ based on particular type of component failures associated with the above described scenario.

TABLE I

Multi-Path Processes for Storage Port Controller 1032 and Internal Fabric 320-1 Active

| Failing Component | Action Performed |
|---|---|
| Host Path A | The host multi-pathing driver fails over to host path B |
| Host 1010 port connected to host path A | The host multi-pathing driver fails over to host path B |
| Fibre Channel Fabric 1012 (including cabling) | The host multi-pathing driver fails over to host path B |
| Fibre channel interface 1015 | The host multi-pathing driver fails over to host path B |
| Blade 310-1 or internal fabric interface 1016 | The host multi-pathing driver fails over to host path B |
| Internal fabric 320-1 | Designate internal fabric 320-1 as inactive (i.e., failed) and activate internal fabric 320-2. This remaining processes are described below in connection with subsection C. |
| Blade 310-3 or internal fabric interface 1019 | Failover to blade 310-4, fibre channel fabric 1110, storage port controller 1034. |
| Storage Port Controller 1032 | Failover to Blade 310-4, fibre channel fabric 1110, and storage port controller 1034. |
| Host path B | Path B shares the same components as those used for path A. Additionally, path B includes the components and actions described in the following rows of this table. |
| Host 1010 port connected to host path B | The host multi-pathing driver fails over to host path A |
| Fibre Channel fabric 1014 | The host multi-pathing driver fails over to host path A |
| Fibre Channel interface 1017 | The host multi-pathing driver fails over to host path A |
| Blade 310-2 or internal fabric interface 1018 | The host multi-pathing driver fails over to host path A |

C. Storage Port Controller 1032 and Internal Fabric 320-2 Active

In a situation where internal fabric 320-1 is inaccessible, system 120 designates internal fabric 320-2 as active and internal fabric 320-1 as inactive. The two paths that host 1010 may access a virtual volume through system 120 includes host path A and host path B, described above in sub section B. Also in this scenario, system 120 accesses ALU 1030 through active storage port controller 1032; storage port controller 1034 is inactive.

When host 1010 provides a virtual volume IO request for ALU 1030 using the host path A, system 120 routes the request through fibre channel fabric 1012, blade 310-1, internal fabric 320-2, to blade 310-3 via internal fabric interface 1019. Blade 310-3 accesses ALU 1030 through storage fibre channel fabric 1100 to storage port controller 1032. When using path B, however, system 120 routes the IO request from fibre channel 1014 to blade 310-2, through internal fabric 320-2 to blade 310-3, which accesses ALU 1030 through port controller 1032, as explained above.

System 120 may also use different paths in this configuration scenario to access ALU 1030 based on the type of components or communication paths that experience faults during runtime operations of the storage virtualization system. Table II describes the various multi-path fail over processes that system 120 implements based on particular type of component failures associated with the above described scenario (e.g., fabric 320-2 and port controller 1032 active).

TABLE II

Multi Path-Processes for Storage Port Controller 1032 and Internal Fabric 320-2 Active

| Failing Component | Action Performed |
|---|---|
| Host Path A | The host multi-pathing driver fails over to host path B |
| Host 1010 port connected to host path A | The host multi-pathing driver fails over to host path B |
| Fibre Channel Fabric 1012 (including cabling) | The host multi-pathing driver fails over to host path B |
| Fibre channel interface 1015 | The host multi-pathing driver fails over to host path B |
| Blade 310-1 or internal fabric interface 1016 | The host multi-pathing driver fails over to host path B |
| Internal fabric 320-2 | Designate internal fabric 320-2 as inactive (i.e., failed) and activate internal fabric 320-1. This remaining processes are described above in connection with subsection B. |
| Blade 310-3 or internal fabric interface 1019 | Failover to blade 310-4, fibre channel fabric 1110, storage port controller 1034. |
| Storage Port Controller 1032 | Failover to Blade 310-4, fibre channel fabric 1110, and storage port controller 1034. |
| Host path B | Path B shares the same components as those used for path A. Additionally, path B includes the components and actions described in the following rows of this table. |
| Host 1010 port connected to host path B | The host multi-pathing driver fails over to host path A |
| Fibre Channel fabric 1014 | The host multi-pathing driver fails over to host path A |
| Fibre Channel interface 1017 | The host multi-pathing driver fails over to host path A |
| Blade 310-2 or internal fabric interface 1018 | The host multi-pathing driver fails over to host path A |

D. Storage Port Controller 1034 and Internal Fabric 320-1 Active

In a situation where internal fabric 320-2 is inaccessible, system 120 designates internal fabric 320-1 as active and internal fabric 320-2 as inactive. The two paths that host 1010 may access a virtual volume through system 120 includes host path A and host path B, described above in sub section B. In this scenario, however, system 120 accesses ALU 1030 through active storage port controller 1034; storage port controller 1032 is inactive.

When host 1010 provides a virtual volume IO request for ALU 1030 using the host path A, system 120 routes the request through fibre channel fabric 1012, blade 310-1, internal fabric 320-1, to blade 310-4 via internal fabric interface 1021. Blade 310-4 accesses ALU 1030 through storage fibre channel fabric 1110 and storage port controller 1034. When using path B, however, network switch system 120 routes the IO request from fibre channel 1014 to blade 310-2, through internal fabric 320-1 to blade 310-4, which accesses ALU 1030 through port controller 1034, as explained above.

System 120 may also use different paths in this configuration scenario to access ALU 1030 based on the type of components or communication paths that experience faults during runtime operations of the storage virtualization system. For example, blade 310-3 may receive an IO request from internal fabric 320-1 and route the request to ALU 1030 through storage fabric 1100 to storage fabric 1110 over a fabric connection path (not shown), and storage port controller 1034. Table III describes the various multi path fail over processes that system 120 implements based on particular type of component failures associated with the above described scenario (e.g., fabric 320-1 and port controller 1034 active).

TABLE III

Multi-Path Processes for Storage Port Controller 1034 and Internal Fabric 320-1 Active

| Failing Component | Action Performed |
|---|---|
| Host Path A | The host multi-pathing driver fails over to host path B |
| Host 1010 port connected to host path A | The host multi-pathing driver fails over to host path B |
| Fibre Channel Fabric 1012 (including cabling) | The host multi-pathing driver fails over to host path B |
| Fibre channel interface 1015 | The host multi-pathing driver fails over to host path B |
| Blade 310-1 or internal fabric interface 1016 | The host multi-pathing driver fails over to host path B |
| Internal fabric 320-1 | Designate internal fabric 320-1 as inactive (i.e., failed) and activate internal fabric 320-2. This remaining processes are described below in connection with subsection E. |
| Blade 310-3 or internal fabric interface 1019 | Failover to blade 310-4, fibre channel fabric 1110, storage port controller 1034. |
| Storage fibre channel fabric 1100 | Failover to blade 310-4, fibre channel fabric 1110, and storage port controller 1034 |
| Storage Port Controller 1032 | Failover to Blade 310-4, fibre channel fabric 1110, and storage port controller 1034. |
| Host path B | Path B shares the same components as those used for path A. Additionally, path B includes the components and actions described in the following rows of this table. |
| Host 1010 port connected to host path B | The host multi-pathing driver fails over to host path A |
| Fibre Channel fabric 1014 | The host multi-pathing driver fails over to host path A |
| Fibre Channel interface 1017 | The host multi-pathing driver fails over to host path A |
| Blade 310-2 or internal fabric interface 1018 | The host multi-pathing driver fails over to host path A |

E. Storage Port Controller 1034 and Internal Fabric 320-2 Active

In a situation where internal fabric 320-1 is inaccessible, system 120 designates internal fabric 320-2 as active and internal fabric 320-1 as inactive. The two paths that host 1010 may access a virtual volume through system 120 includes host path A and host path B, described above in sub section B. Further in this scenario, storage port controller 1032 is inactive, thus system 120 accesses ALU 1030 through active storage port controller 1034.

When host 1010 provides a virtual volume IO request for ALU 1030 using the host path A, system 120 routes the request through fibre channel fabric 1012, blade 310-1, internal fabric 320-2, to blade 310-4 via internal fabric interface 1021. Blade 310-4 accesses ALU 1030 through storage fibre channel fabric 1110 and storage port controller 1034. When using path B, system 120 routes the IO request from fibre channel 1014 to blade 310-2, through internal fabric 320-2 to blade 310-4, which accesses ALU 1030 through port controller 1034, as explained above.

System 120 may also use different paths in this configuration scenario to access ALU 1030 based on the type of components or communication paths that experience faults during runtime operations of the storage virtualization system. For example, blade 310-3 may receive an IO request from internal fabric 320-2 and route the request to ALU 1030 through storage fabric 1100 to storage fabric 1110 over fabric connection path (not shown), and storage port controller 1034. Table IV describes the various multi path fail over processes that system 120 implements based on particular type of component failures associated with the above described scenario (e.g., fabric 320-2 and port controller 1034 active).

TABLE IV

Multi-Path Processes for Storage Port Controller 1034 and Internal Fabric 320-2 Active

| Failing Component | Action Performed |
| --- | --- |
| Host Path A | The host multi-pathing driver fails over to host path B |
| Host 1010 port connected to host path A | The host multi-pathing driver fails over to host path B |
| Fibre Channel Fabric 1012 (including cabling) | The host multi-pathing driver fails over to host path B |
| Fibre channel interface 1015 | The host multi-pathing driver fails over to host path B |
| Blade 310-1 or internal fabric interface 1016 | The host multi-pathing driver fails over to host path B |
| Internal fabric 320-2 | Designate internal fabric 320-2 as inactive (i.e., failed) and activate internal fabric 320-1. This remaining processes are described above in connection with subsection D. |
| Blade 310-4 or internal fabric interface 1021 | Failover to blade 310-3, fibre channel fabric 1110, storage port controller 1032. |
| Storage fibre channel fabric 1110 | Failover to blade 310-3, fibre channel fabric 1110,and storage port controller 1032 |
| Storage Port Controller 1034 | Failover to Blade 310-3, fibre channel fabric 1110,and storage port controller 1032. |
| Host path B | Path B shares the same components as those used for path A. Additionally, path B includes the components and actions described in the following rows of this table. |
| Host 1010 port connected to host path B | The host multi-pathing driver fails over to host path A |
| Fibre Channel fabric 1014 | The host multi-pathing driver fails over to host path A |
| Fibre Channel interface 1017 | The host multi-pathing driver fails over to host path A |
| Blade 310-2 or internal fabric interface 1018 | The host multi-pathing driver fails over to host path A |

F. Symmetric Access Storage Device and Internal Fabric 320-1 Active

As explained, ALUs 1030 and/or 1040 may be implemented by storage devices using symmetric access models that provide universal multiple paths to any LUs maintained within these devices. System 120 may use one or more paths to the LUs without retarding access performance or issuing path management commands. For example, if a failure or reconfiguration event occurs, system 120 automatically selects another path without receiving or requiring vendor specific path management commands associated with the storage devices. In such symmetrical models, both storage access ports to an ALU are activated, giving system 120 additional options for accessing LUs of a requested virtual volume.

In this scenario, internal fabric 320-2 is inaccessible. Thus, system 120 designates internal fabric 320-1 as active and internal fabric 320-2 as inactive. The two paths that host 1010 may access a virtual volume through system 120 includes host path A and host path B, described above in sub section B. Further in this scenario, storage port controllers 1032 and 1034 are active, thus allowing system 120 to access ALU 1030 through either port.

When host 1010 provides a virtual volume IO request for ALU 1030 using host path A, system 120 routes the request through fibre channel fabric 1012, blade 310-1, internal fabric 320-1, to blade 310-3 via internal fabric interface 1019. Blade 310-3 accesses ALU 1030 through storage fibre channel fabric 1100 and storage port controller 1032. When using path B, system 120 routes the IO request from fibre channel 1014 to blade 310-2, through internal fabric 320-1 to blade 310-3, which accesses ALU 1030 through port controller 1032 as explained above.

Because both storage controller ports 1032 and 1034 are active, system 120 may also route IO requests to ALU 1030 using port 1034. Accordingly, system 120 may route the host request from internal fabric 320-1 to blade 310-4, which access ALU 1030 through storage fibre channel fabric 1110 and port 1034. Table V describes the various multi path fail over processes that system 120 implements based on the symmetric access models employed by the storage devices hosting ALUs 1030 and 1040 and internal fabric 320-2 being inactive.

TABLE V

Multi-Path Processes for Storage Port Controllers 1032 and 1034, and Internal Fabric 320-1 Active

| Failing Component | Action Performed |
| --- | --- |
| Host Path A | The host multi-pathing driver fails over to host path B |
| Host 1010 port connected to host path A | The host multi-pathing driver fails over to host path B |
| Fibre Channel Fabric 1012 (including cabling) | The host multi-pathing driver fails over to host path B |
| Fibre channel interface 1015 | The host multi-pathing driver fails over to host path B |
| Blade 310-1 or internal fabric interface 1016 | The host multi-pathing driver fails over to host path B |
| Internal fabric 320-1 | Designate internal fabric 320-1 as inactive (i.e., failed) and activate internal fabric 320-2 (if possible). |
| Blade 310-3 or internal fabric interface 1019 | Failover to blade 310-4, fibre channel fabric 1110, storage port controller 1034. |
| Storage fibre channel fabric 1100 | Failover to blade 310-4, fibre channel fabric 1110, and storage port controller 1034 |
| Storage Port Controller 1032 | Failover to Blade 310-4, fibre channel fabric 1110, and storage port controller 1034. |
| Host path B | Path B shares the same components as those used for path A. Additionally, path B includes the components and actions described in the following rows of this table. |
| Host 1010 port connected to host path B | The host multi-pathing driver fails over to host path A |

TABLE V-continued

Multi-Path Processes for Storage Port Controllers 1032 and 1034, and Internal Fabric 320-1 Active

| Failing Component | Action Performed |
|---|---|
| Fibre Channel fabric 1014 | The host multi-pathing driver fails over to host path A |
| Fibre Channel interface 1017 | The host multi-pathing driver fails over to host path A |
| Blade 310-2 or internal fabric interface 1018 | The host multi-pathing driver fails over to host path A |

G. Symmetric Access Storage Device and Internal Fabric 320-2 Active

In this scenario, internal fabric 320-1 is inactive. Thus, system 120 designates internal fabric 320-2 as active. The two paths that host 1010 may access a virtual volume through system 120 includes host path A and host path B, described above in sub section B. Further in this scenario, storage port controllers 1032 and 1034 are active, thus allowing system 120 to access ALU 1030 through either port.

When host 1010 provides a virtual volume IO request for ALU 1030 using the host path A, system 120 routes the request through fibre channel fabric 1012, blade 310-1, internal fabric 320-2, to blade 310-4 via internal fabric interface 1021. Blade 310-4 accesses ALU 1030 through storage fibre channel fabric 1110 and storage port controller 1034. When using path B, system 120 routes the IO request from fibre channel 1014 to blade 310-2, through internal fabric 320-2 to blade 310-4, which accesses ALU 1030 through port controller 1034, as explained above.

Because both storage controller ports 1032 and 1034 are active, system 120 may route IO requests to ALU 1030 using port 1032. Accordingly, system 120 may route the host request from internal fabric 320-2 to blade 310-3, which access ALU 1030 through storage fibre channel fabric 1100 and port 1032. Table VI describes the various multi path fail over processes that system 120 implements based on the symmetric access models employed by the storage devices hosting ALUs 1030 and 1040 and internal fabric 320-1 being inactive.

TABLE VI

Multi-Path Processes for Storage Port Controllers 1032 and 1034, and Internal Fabric 320-2 Active

| Failing Component | Action Performed |
|---|---|
| Host Path A | The host multi-pathing driver fails over to host path B |
| Host 1010 port connected to host path A | The host multi-pathing driver fails over to host path B |
| Fibre Channel Fabric 1012 (including cabling) | The host multi-pathing driver fails over to host path B |
| Fibre channel interface 1015 | The host multi-pathing driver fails over to host path B |
| Blade 310-1 or internal fabric interface 1016 | The host multi-pathing driver fails over to host path B |
| Internal fabric 320-2 | Designate internal fabric 320-2 as inactive (i.e., failed) and activate internal fabric 320-1 (if possible). |
| Blade 310-4 or internal fabric interface 1021 | Failover to blade 310-3, fibre channel fabric 1100, storage port controller 1032. |
| Storage fibre channel fabric 1110 | Failover to blade 310-3, fibre channel fabric 1100, and storage port controller 1032 |
| Storage Port Controller | Failover to Blade 310-3, fibre channel fabric |

TABLE VI-continued

Multi-Path Processes for Storage Port Controllers 1032 and 1034, and Internal Fabric 320-2 Active

| Failing Component | Action Performed |
|---|---|
| 1034 | 1100, and storage port controller 1032. |
| Host path B | Path B shares the same components as those used for path A. Additionally, path B includes the components and actions described in the following rows of this table. |
| Host 1010 port connected to host path B | The host multi-pathing driver fails over to host path A |
| Fibre Channel fabric 1014 | The host multi-pathing driver fails over to host path A |
| Fibre Channel interface 1017 | The host multi-pathing driver fails over to host path A |
| Blade 310-2 or internal fabric interface 1018 | The host multi-pathing driver fails over to host path A |

H. Fault/Error Recovery and Notification

Accordingly, system 120 provides symmetric multi-pathing access models to host 1010 for accessing virtual volumes configured for that host. System 120 provides continuous access to the virtual volumes by adjusting access for host paths extending from host 1010 to the storage device maintaining the virtual volume data. Using redundant ports and controllers, system 120 performs real time fault tolerant operations to ensure virtual volumes are accessible by host 1010.

Additionally, system 120 may perform error and/or fault notification operations. For example, system 120 may execute fault reporting software that notifies a user (e.g., administrator) of a storage path failure using known notification techniques (e.g., SNMP notification processes) and GUIs. Thus, if internal fabric 320-2 fails, system 120 notifies an administrator while activating the standby internal fabric 320-1 to continue virtual volume access operations. System 120 also executes (automatically or by manual direction) diagnostic processes that evaluates the possible causes for fabric 320-1 failing. If the diagnostics determine a recovery recommendation, system 120 may be configured to execute fault recovery processes that automatically correct the problems that caused fabric 320-2 (or any component of switch 120) to fail. Alternatively, or additionally, the fault recovery processes may notify the administrator of the recommendations for manual recovery procedures to be performed.

Although the above exemplary multi-path processes are described in connection with a single host 1010, these embodiments of the invention apply to configurations involving a number of different hosts connected to system 120.

VIII. SNAPSHOT

A. Overview

As described above, a virtual volume for a host 110 may be stored over many different ALUs 340. The structure of a distributed virtual volume may be described in a virtual volume tree, such as virtual volume tree 600 described above. To ensure security and availability of data stored in the virtual volume, systems consistent with the invention may provide a "snapshot" of the virtual volume.

A snapshot is a point-in-time representation of a virtual volume that may be presented to host 110, an administrator, etc. Such a representation may be useful in a number of ways. For example, a snapshot may provide a static image that may be used to create a back up copy of the virtual volume. In another example, a snapshot may provide a copy of the virtual volume that may be used for experimentation or development without affecting the underlying virtual volume. Further, a snapshot may enable the re-creation of a virtual volume as it appeared at a given point in time in case of a massive system failure. The snapshot may also be made available to the host as a complete backup in the event of a problem with the underlying virtual volume.

In one embodiment, a snapshot image cannot be altered once it is created. In this way, the snapshot retains its accuracy as a point-in-time representation of a virtual volume, even after the virtual volume itself changes. For example, the virtual volume may change as data is stored or retrieved. As part of the snapshot, a change log may be maintained to track all changes to a virtual volume after a snapshot point-in-time image has been created.

B. Creation of a Snapshot

Figure 12:
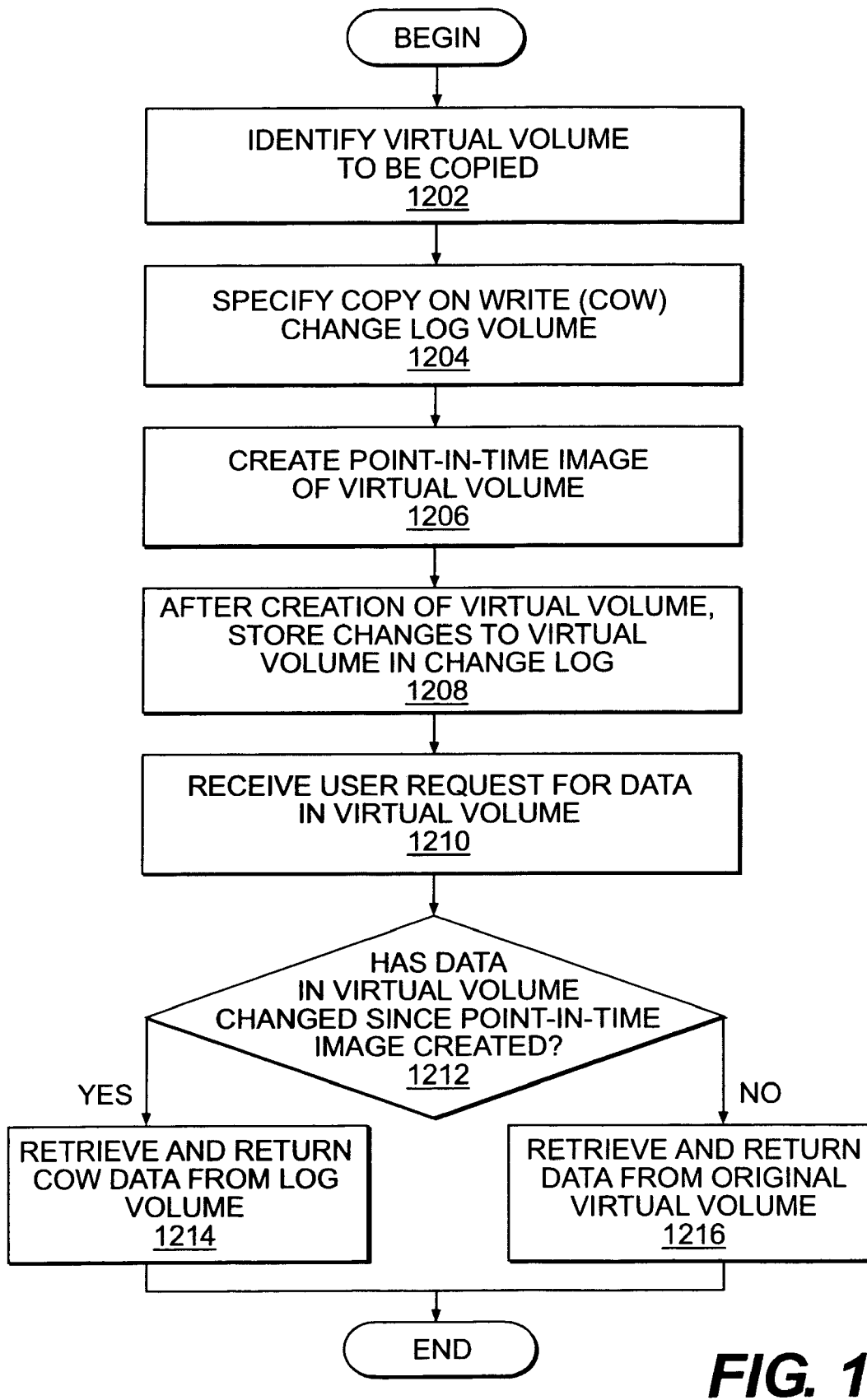
FIG. 12 is a flowchart of a process for creating a snapshot point-in-time image consistent with certain embodiments of the present invention.

FIG. 12 is a flowchart of an exemplary method of creating a snapshot point-in-time image. To create a snapshot image, a user may use an interface such as a GUI or CLI to identify an original virtual volume to be copied (Step 1202) and a copy on write (COW) change log volume (Step 1204). A point-in-time image of the virtual volume may then be created as described below (Step 1206). After the creation of the point-in-time image, any changes to the underlying virtual volume may be written to the change log volume (Step 1208). As it tracks any changes to the underlying volume, the change log is also tracking any changes to the change log volume. In this way, the point-in-time image and the change log may be used together to respond to user requests for data.

When a user request for data is received (Step 1210), it may be fulfilled by determining whether the relevant data in the original volume has changed since the point-in-time image was created (Step 1212). If the relevant data has changed (Step 1212, YES), then the COW data may be retrieved from the change log and returned to the user. If the data has not changed (Step 1214, NO), then the data may be retrieved from the original volume and returned to the user (Step 1216). Alternatively, the unchanged data may be retrieved from the point-in-time copy.

An overall point-in-time image of a virtual volume may be created using a virtualization tree that describes the virtual volume to be copied, such as virtual volume tree 600. As represented in the virtualization tree, the virtual volume is logically divided into partitions. To create a point-in-time image, a snapshot copy may be made of each partition. These snapshot partitions may be created, for example, using the object creation techniques described above in section V. The partition snapshots may then be combined to create a complete point-in-time copy of the virtual volume represented by the virtualization tree.

Figure 13:
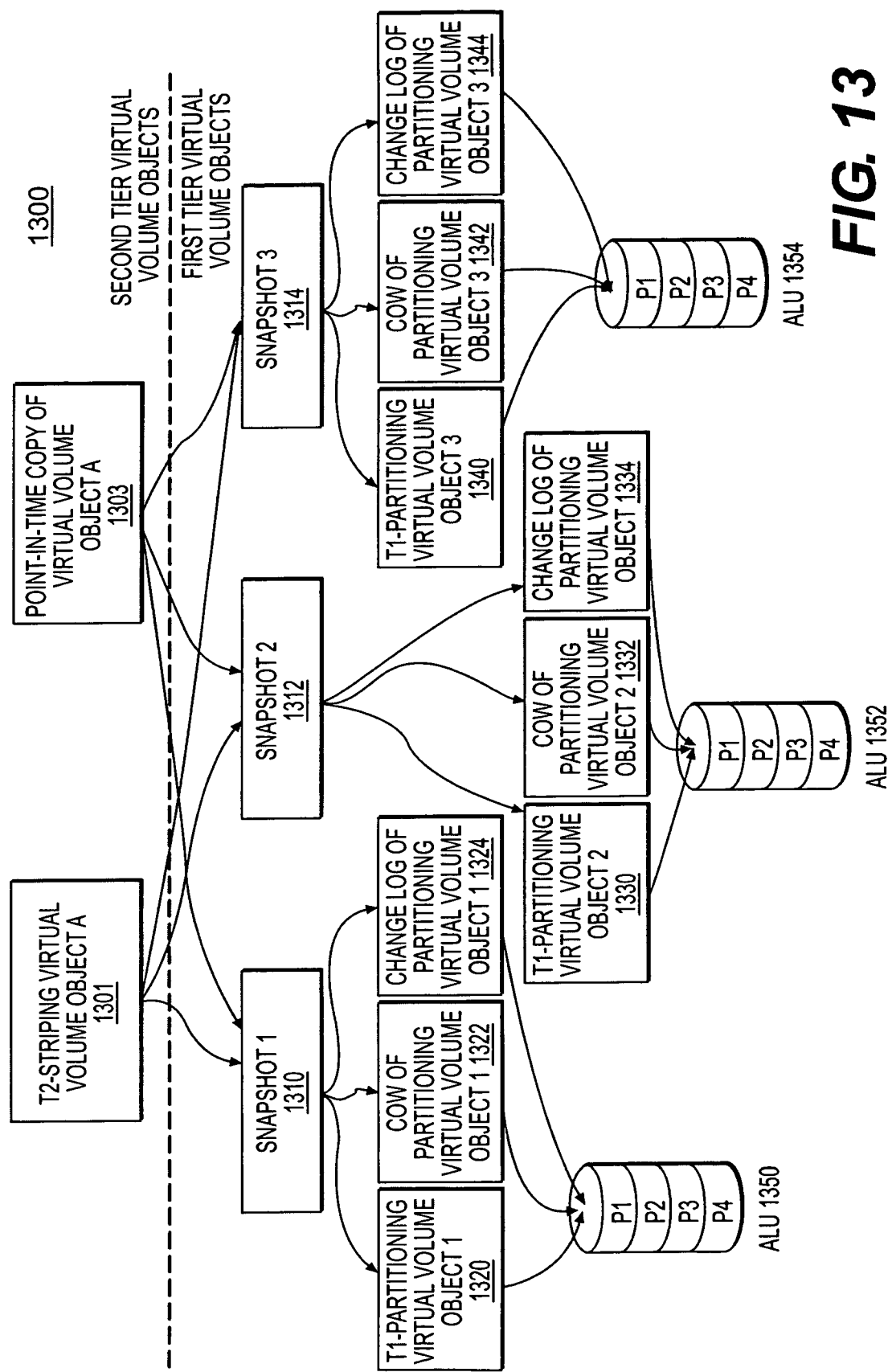
FIG. 13 is a block diagram of a distributed snapshot point-in-time image tree consistent with certain embodiments of the present invention.

FIG. 13 is a block diagram of a distributed snapshot point-in-time image tree 1300 consistent with an embodiment of the invention. A snapshot virtualization layer may be inserted above the T1 partitioning virtual volume objects in a virtual volume to be "snapped," or copied. In this way, the snapshot virtualization layer may be accessed by T2 volume objects and, therefore, by host 110. A point-in-time image of a virtual volume may be created using any of the transformation mappings (e.g., striping, striping over mirroring, concatenation, etc.) used in the original virtual volume.

FIG. 13 depicts second tier, or T2, striping virtual volume object A 1301 that is to be copied. A point-in-time copy of virtual volume object A 1303 may be created as a second tier object that references a set of first tier, or T1, snapshot objects. For example, a point-in-time copy of virtual volume object A 1303 may include references to a snapshot object-1 1310, a snapshot object-2 1312, and a snapshot object-3 1314. In this embodiment, snapshot objects 1310-1314 make up a snapshot virtualization layer between the T1 and T2 objects.

For example, each snapshot object 1310-1314 may include references to a partition object from the original volume, a COW copy of the partition, and a change log for the partition. The partition object from the original volume is the object from the original virtualization tree representing the original volume to be copied. The COW copy of the partition maintains a copy of data blocks that are written to the original volume since the point-in-time image was created, and the change log provides a transaction log of changes since the point-in-time image was created.

For example, snapshot-1 1310 includes a reference to T1 partitioning virtual volume object-1 1320, COW copy of partitioning virtual volume object-1 1322, and a change log of partitioning virtual volume object-1 1324. These T1 objects may be assigned, for example, to ALU 1350. If snapshot 1 1310 is also assigned to ALU 1350, the references from snapshot-1 1310 to T1 partitioning virtual volume object-1 1320, COW copy of partitioning virtual volume object-1 1222, and change log of partitioning virtual volume object-1 1224 may be implemented using, for example, a local reference node such as LRN 913. Alternatively, objects 1320-1324 may be stored on different ALUs from snapshot-1 1310, and the references may be implemented using, for example, a remote reference node such as RRN 914.

Snapshot-2 1312 has a reference to T1 partitioning virtual volume object-2 1330, COW copy of partitioning virtual volume object-2 1332, and a change log of partitioning virtual volume object-2 1334. These T1 objects may be assigned, for example, to ALU 1352. If snapshot-2 1312 is also assigned to ALU 1352, the references from snapshot-2 1312 to T1 partitioning virtual volume object-2 1330, COW copy of partitioning virtual volume object-2 1332, and change log of partitioning virtual volume object-2 1334 may be implemented using, for example, a local reference node such as LRN 913. Alternatively, objects 1230-1234 may be stored on different ALUs from snapshot object-2 1312, and the references may be implemented using, for example, a remote reference node such as RRN 914.

Further referring to FIG. 13, snapshot-3 1314 has a reference to T1 partitioning virtual volume object-3 1340, COW copy of partitioning virtual volume object 3 1342, and a change log of partitioning virtual volume object-3 1344. These T1 objects may be assigned, for example, to ALU 1354. If snapshot-3 1314 is also assigned to ALU 1354, the references from snapshot-3 1314 to T1 partitioning virtual volume object-3 1340, COW copy of partitioning virtual volume object-3 1342, and change log of partitioning virtual volume object-3 1344 may be implemented using, for example, a local reference node such as LRN 913. Alternatively, objects 1340-1344 may be stored on different ALUs from snapshot object-3 1314, and the references may be implemented using, for example, a remote reference node such as RRN 914.

Distributed snapshot point-in-time image tree 1300 may be created and maintained using, for example, processes described above with reference to virtual volume tree 600. To create a point-in-time snapshot image, secure LUN mapping may be used to map the point-in-time image and the individual snapshot objects to the LUNs of any available ALUs. To provide flexibility and efficiency, the point-intime image may be mapped to a subset of ALUs that is the same as or different from the subset of ALUs containing the original volume. For example, COW of partitioning virtual volume object-1 1322 may instead be mapped to ALU 1352 or ALU 1354.

By creating a snapshot virtualization layer at the T1 level, systems consistent with the present invention enable a resource-intense operation like data back-up to be broken up over multiple resources, e.g., ALUs, SPs, etc. In this way, snapshot objects, e.g., change logs and COW copies, may be spread across LUs in order to provide load balancing, fault tolerance, etc.

In one embodiment, multiple snapshot images may be maintained for a single volume. For example, an API may be provided for a user to schedule the creation and deletion of snapshot images, for example, on a periodic basis or upon the occurrence of a predetermined event. These snapshot images may be used, for example, to restore a virtual volume that has failed or to study changes made over time.

IX. FAIL COMPONENT PROCESSING/QUIESCENCE

A. Overview

Systems consistent with the invention provide techniques for handling failures after a virtual volume has been initialized. Such failures could be caused, for example, by power failures, unexpected resets, or component failures. Each storage processor (SP) in network switch system 120 may include a virtualization state manager (VSM) to handle these failures. The VSM may manage configuration and state information, e.g., user data definitions of storage resources, for its volume and any attached ALUs. For example, referring to FIG. 4, VSM 411 may maintain configuration information for control path volume mapping state machines 412, data path volume mapping state machines 414, ALU 440, and ALU 442. Configuration and state information may include, for example, a list of components, a volume definition, current state of the volume, current state of the components, etc.

To maintain configuration and state information, the VSM may periodically conduct an inventory of devices attached to its SP and determine state information for those devices. Such an inventory may be triggered, for example, by a change in an attached device, a system error, etc. The state information might include an indication of whether a device, such as an ALU or LU object, is in a good or failed status. State information may also include, for example, a list of all components, the current state of the components, a definition of a volume, and the current state of the volume. During its periodic inventory, the VSM may detect a volume with a failed status. Alternatively, a volume manager may detect the failure of a volume and send notification to the VSM. The VSM may collect additional failure information, such as a time of failure or a fail sequence number. The fail sequence number may indicate, for example, which device in a mirrored pair failed first. The VSM may provide the failure information to a host or administrator through SNMP or GUI notification. In addition, the VSM may perform processes to manage the failed component without disruption of the volume or the loss of data.

Figure 14:
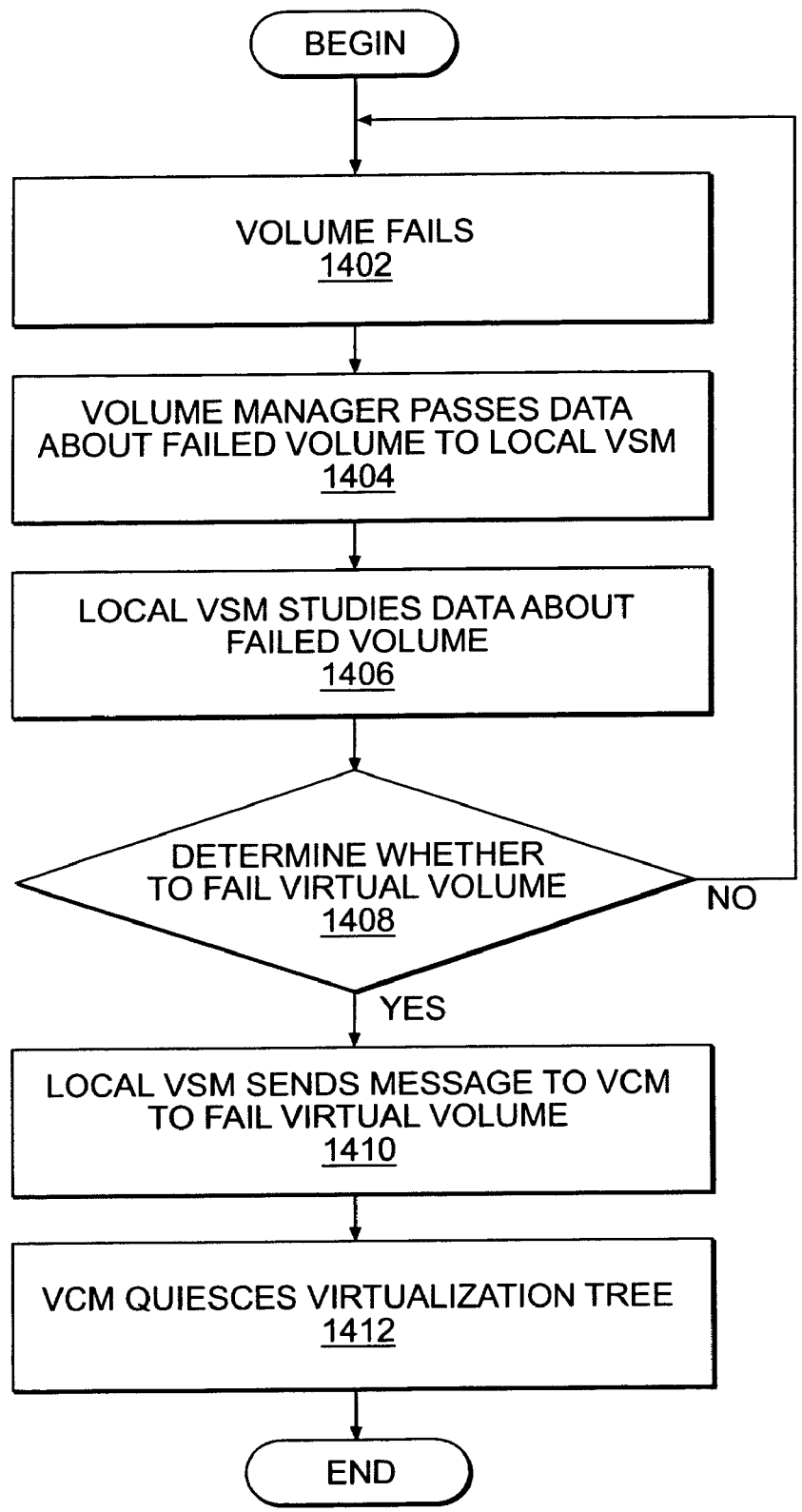
FIG. 14 is a flowchart of a process for handing a failed component consistent with certain embodiments of the present invention.

FIG. 14 is a flowchart of a process for handing a failed component consistent with an embodiment of the present invention. When a volume fails (Step 1402), the volume manager (VOM) passes data about the failed volume to the local VSM (Step 1404). As described above, a VOM manages a virtualized storage device, including partitions of ALUs, striping partitions, mirroring partitions, etc. The VOM interacts with the VSM to coordinate the state of the virtual volumes managed by the VOM. The VSM may collect and study failure information about the failed volume, such as a time of failure or a fail sequence number. The VSM may also consider data about the virtualization system's usage of the component. Based on the collected information, the VSM determines whether to fail the virtual volume (Step 1408). For example, the VSM may fail a virtual volume anytime the failed device could cause a state change in the volume. If the VSM decides to fail the virtual volume (Step 1408, YES), then the local VSM notifies the virtualization coherency manager (VCM) that the virtual volume is to be failed (Step 1410). If the VSM decides not to fail the virtual volume (Step 1408, NO), then processing continues until another failed volume is detected. Once the VCM receives the instruction to fail the virtual volume, it quiesces the virtualization tree (Step 1412), as described below.

Figure 15:
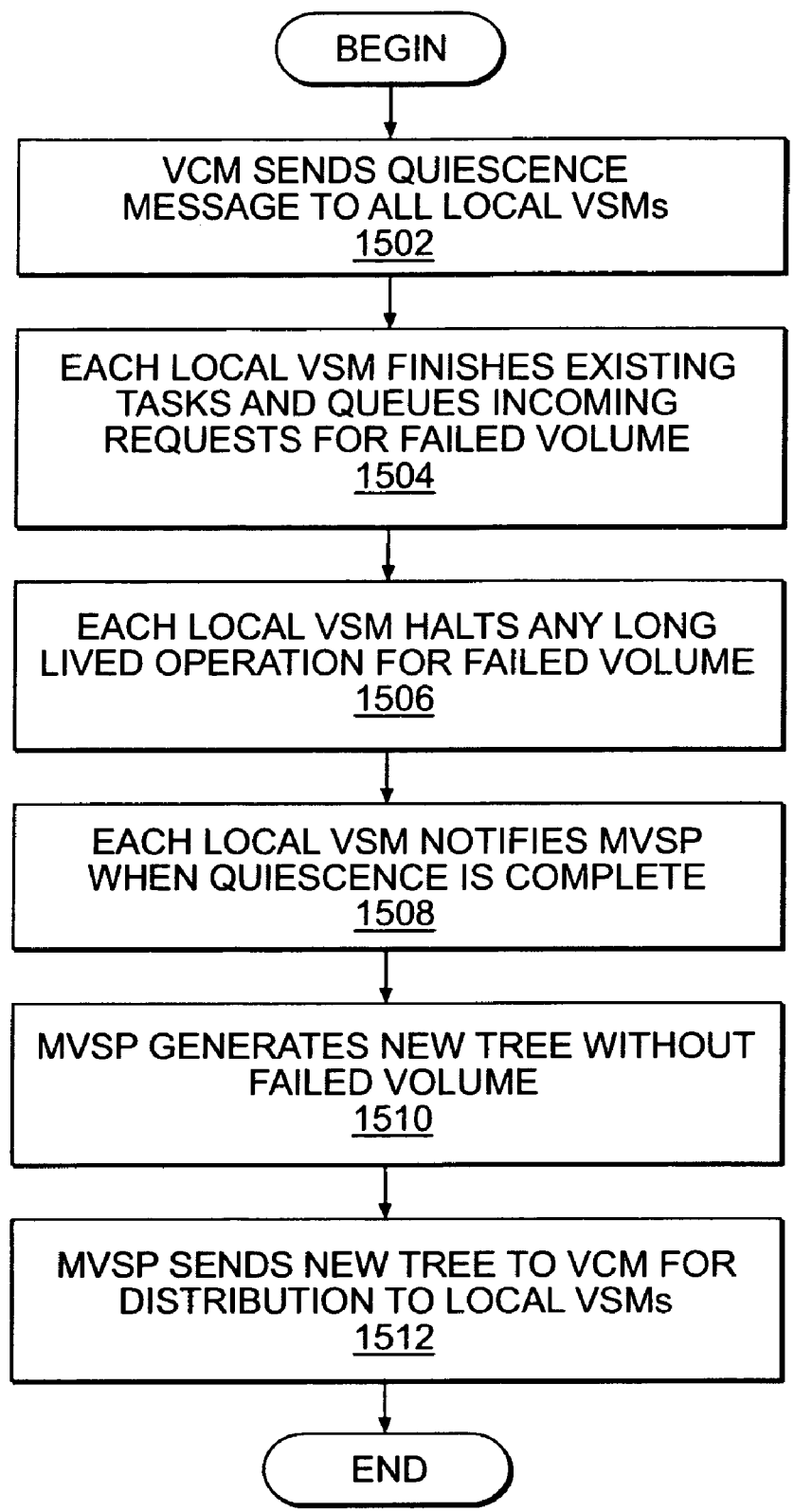
FIG. 15 is a flowchart of a process for quiescing a virtualization tree consistent with certain embodiments of the present invention.

FIG. 15 is a flowchart of a process for quiescing a virtualization tree consistent with an embodiment of the invention. After receiving an instruction to fail a virtual volume, the VCM sends a quiescence instruction, including an indication of the failed volume, to the local VSM on each SP in the system (Step 1502). Each VSM completes existing tasks and then queues any incoming requests (e.g., write operations) for the failed volume (Step 1504). Each VSM also stops any long lived operation (e.g., scrubbing, rebuilding, etc.) for the failed volume (Step 1506). When existing tasks and long lived operations have been stopped, each VSM notifies the MVSP that local quiescence is complete (Step 1508). The MVSP may then generate a new virtualization tree without the failed volume (Step 1510). For example, the MVSP may generate a new system image with data partitioned across the existing ALUs except for the failed volume and pass the new system image to the virtualization block (VB) for creation of a global system image. The VB may in turn store the global system image (e.g., a virtualization tree) in a memory that is accessible to the host and/or administrator. Finally, the MVSP may send the tree mapping the new virtual volume object definitions to the local VSMs to implement the new volume without the failed volume (Step 1512). The creation and distribution of a new virtualization tree may be implemented using the processes described above in sections V and VI.

Another function the VSM may perform is late ALU recovery, i.e., the addition of an ALU to a virtualization tree after the tree has been initialized. When an ALU becomes available after initialization, the VSM may present an interface to an administrator or host to list newly-available storage resources, including the late ALU. For example, a storage resource may be identified by its storage device identifier and LUN. The VSM may provide other information about the available storage device, such as its current usage level. The administrator or host may be prompted, via the interface, to choose to reclaim a newly-available ALU. Alternatively, the VSM may automatically reclaim storage devices as they become available.

To detect a late ALU, the VSM may periodically monitor the communication ports of a Storage Resource Card (SRC) of its corresponding SP. For example, each SP may generate periodic commands for scanning the communication port interfaces to identify any late ALUs that are connected to its host SRC. Alternatively, an ALU may send a message to its SP when it becomes available, e.g., when it powers up or is reset. In another alternative, the VSM may be triggered to check the communication ports by, for example, an error in a component. The SP may collect ALU identifying data, memory space data, and any other type of configuration information associated with the storage capabilities of the connected ALU. In one embodiment, the SP may access the late ALU's SUSID to determine whether the ALU is indeed available as a resource.

To reclaim a late ALU, the VSM may initiate processes described above in section IV. That is, the VSM notifies a virtualization coherency manager (VCM) of the new ALU and the VCM requests the master virtualization SP (MVSP) to reconfigure the virtual volume to include the new ALU. For example, the MVSP may generate a new system image with data partitioned across the existing ALUs and the new ALU and pass it to the virtualization block (VB) for creation of a global system image, i.e., a collection of virtual volume definitions reflecting relationships between different forms of associations between the LU objects included in the ALUs, such as partitions, mirrored pairs, striped volumes of segmented LUs, etc. Once it is created, the VB stores the global system image (e.g., a virtualization tree) in a memory that is accessible to the host and/or administrator. Finally, the VCM may map the virtual volume object definitions to implement the new volume with the added ALU.

CONCLUSION

The foregoing description of implementations of the invention has been presented for purposes of illustration and description. It is not exhaustive and does not limit the invention to the disclosed form. Modifications and variations are possible in light of the above teachings or may be acquired from practicing of the invention. The described implementation includes software, but the invention may be implemented as a combination of hardware and software or in hardware alone. The invention may be implemented with both object-oriented and non-object-oriented programming systems.

Further, the processes described above with respect to FIGS. 5A-5C, 8A-8B, 11, 12, 14 and 15 are not limited to the sequences illustrated in these figures. Other processes associated with the embodiments are also not limited to the sequences described above. One skilled in the art will appreciate that variations to the sequence of steps included in these processes may vary without departing from the scope of the invention. Further, additional or fewer steps may be included in these processes to provide a storage virtualization environment that provides available, consistent, and/or scalable virtual volumes for one or more host systems.

Additionally, although aspects of the invention are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents.

What is claimed is:

1. A network switch system for initializing a virtual volume in a system including a host system, and storage devices, the network switch system comprising:
a set of storage processors including first and second tier storage processors;
a Virtualization Coherency Manager (VCM) for receiving storage connectivity identifying which storage processors are connected to selected ones of the storage devices; and
a master storage processor for creating a logical tree based on the storage connectivity information, the logical tree reflecting a virtual volume of data distributed across the storage devices and includes (i) first tier objects representing partitions of the virtual volume data and (ii) second tier objects representing a logical configuration of the virtual volume,
wherein the VCM assigns the first tier objects to selective ones of the first tier storage processors and assigns the second tier objects to selective ones of the second tier storage processors based on the logical tree, and wherein each of the selective first and second tier storage processors initialize a local portion of the virtual volume to allow the host system to access the virtual volume through the network switch system.

2. The network switch system of claim 1, wherein the VCM designates a first tier storage processor as the master storage processor; and
the master storage processor collects the connectivity information from each storage device, wherein the connectivity information includes state information corresponding to virtual volume data included in the storage devices.

3. The network switch system of claim 1, wherein the master storage processor creates the logical tree by creating a system image of the virtual volume indicating which of the first tier storage processors are connected to particular ones of the storage devices storing virtual volume data associated with the virtual volume.

4. The network switch system of claim 1, wherein the logical configuration is a data protection configuration that distributes the virtual volume data across the storage devices.

5. The network switch system of claim 4, wherein the data protection configuration includes at least one of a striping configuration, a mirroring configuration, a concatenation configuration, and a striping over mirroring configuration.

6. The network switch system of claim 1, wherein the second tier objects include information referencing selective first tier objects based on the logical configuration of the virtual volume.

7. The network switch system of claim 1, wherein the master storage processor creates the logical tree based on virtual volume objects collected from selected ones of the storage devices, wherein the virtual volume objects identify which first tier storage processors are connected to corresponding ones of the storage devices.

8. The network switch system of claim 1, wherein the VCM is configured to assign a first tier object to a corresponding first tier storage processor based on whether the corresponding first tier storage processor is connected to a storage device including a partition of the virtual volume data.

9. The network switch system of claim 8, wherein the VCM is configured to assign the second tier objects by instructing the selected second tier storage processors to discover the first tier objects assigned to corresponding first tier storage processors.

10. The network switch system of claim 9, wherein the VCM is further configured to create a reference between a second tier object and a first tier object when the first tier object is associated with virtual volume partition data that is protected by the logical configuration provided by the second tier object.

11. The network switch system of claim 1, wherein each storage device includes a local portion of a virtualization state manager database (VSMDB) having virtualization objects associated with the local portion of the virtual volume, and wherein the VCM is configured to select a single first tier storage processor as the master storage processor and the master storage processor is configured to collect the virtualization objects stored in the VSMDB local portions included in the storage devices connected to the first tier storage processors.

12. The network switch system of claim 11, wherein the master storage processor is further configured to create the logical tree based on VSMDB data identifying which first tier storage processors are connected to particular storage devices having portions of the virtual volume data and send the logical tree to the VCM.

13. The network switch system of claim 1, wherein the master storage processor creates the logical tree by at least one of:
   logically partitioning the virtual volume data stored in the storage devices;
   logically mirroring the partitioned virtual volume data across multiple storage devices;
   logically striping the partitioned virtual volume data across multiple storage devices;
   logically striping the mirrored partitioned virtual volume data across multiple storage devices; and
   logically concatenating the partitioned virtual volume data across multiple storage devices.

14. The network switch system of claim 1, wherein each storage processor includes a Virtualization State Manager (VSM) and the VCM assigns the first tier objects by passing the first tier objects to the VSM of each first tier storage processor connected to a storage device storing a partition of the virtual volume.

15. The network switch system of claim 14, wherein the VCM passes selective ones of the second tier objects to the VSM of each second tier storage processor connected to the host system.

16. The network switch system of claim 15, wherein the VCM passes selective ones of the second tier objects to a first tier processor connected to the host system and to a storage device storing a partition of the virtual volume data.

17. The network switch system of claim 1, wherein the VCM assigns the second tier objects by assigning a second tier object to a corresponding second tier storage processor based on whether the corresponding second tier processor is connected to the host system.

18. A method for providing a virtual volume in a system including a host system, storage devices, and a network switch system having first and second tier storage processors, the method performed by the network switch comprising:
   identifying, for each storage device, any first tier storage processors connected to the respective storage device;
   creating a logical tree reflecting a virtual volume of data distributed across the storage devices, wherein the logical tree includes (i) first tier objects representing partitions of the virtual volume data and (ii) second tier objects representing a logical configuration of the virtual volume;
   assigning the first tier objects to selective ones of the first tier storage processors;
   assigning the second tier objects to selective ones of the second tier storage processors; and
   managing the virtual volume using the first and second tier objects and storage processors.

19. The method of claim 18, wherein identifying includes:
   designating a first tier storage processor as a Master Virtualization Storage Processor (MVSP); and
   collecting, by the MVSP, virtualization objects from each storage device, wherein the virtualization objects include state information corresponding to virtual volume data included in the storage devices.

20. The method of claim 19, wherein creating the logical tree includes:
   creating, by the MVSP, a system image of the virtual volume indicating which of the first tier storage processors are connected to particular ones of the storage devices storing the virtual volume data.

21. The method of claim 18, wherein the logical configuration is a data protection configuration that distributes the virtual volume data across the storage devices.

22. The method of claim 21, wherein the data protection configuration includes at least one of a striping configuration, a mirroring configuration, a concatenation configuration, and a striping over mirroring configuration.

23. The method of claim 18, wherein the second tier objects include information referencing selective first tier objects based on the logical configuration of the virtual volume.

24. The method of claim 18, wherein creating the logical tree includes:
   creating the tree based on virtual volume objects collected from selected ones of the storage devices, wherein the virtual volume objects identify which first tier storage processors are connected to corresponding ones of the storage devices.

25. The method of claim 18, wherein assigning the first tier objects includes:
   assigning a first tier object to a corresponding first tier storage processor based on whether the corresponding first tier storage processor is connected to a storage device including a partition of the virtual volume data.

26. The method of claim 25, wherein assigning the second tier objects includes:
   discovering, by the second tier storage processors, the first tier objects assigned to corresponding first tier storage processors; and
   creating a reference between a second tier object and a first tier object when the first tier object is associated with virtual volume partition data that is protected by the logical configuration provided by the second tier object.

27. The method of claim 18, wherein each storage device includes a portion of a virtualization state manager database (VSMDB) having virtualization objects associated with a local version of the virtual volume, and wherein identifying includes:
   selecting a single first tier storage processor as a Master Virtualization Storage Processor (MVSP);
   collecting, by the MVSP, virtualization objects stored in the VSMDB portions included in the storage devices connected to the first tier storage processors;
   creating, by the MVSP, the logical tree based on VSMDB data identifying which first tier storage processors are connected to particular storage devices having portions of the virtual volume data; and
   sending the system image to a Virtualization Coherency Manager (VCM).

28. The method of claim 27, wherein the VCM assigns the first and second tier objects to the first and second tier storage processors, respectively.

29. The method of claim 18, wherein creating the logical tree includes at least one of:
   logically partitioning the virtual volume data stored in the storage devices;

logically mirroring the partitioned virtual volume data across multiple storage devices;

logically striping the partitioned virtual volume data across multiple storage devices;

logically striping the mirrored partitioned virtual volume data across multiple storage devices; and logically concatenating the partitioned virtual volume data across multiple storage devices.

30. The method of claim 18, wherein the network switch system includes a Virtualization Coherency Manager (VCM) and each storage processor includes a Virtualization State Manager (VSM) and assigning the first tier objects includes:

passing, by the VCM, the first tier objects to the VSM of each first tier storage processor connected to a storage device storing a partition of the virtual volume data.

31. The method of claim 30, further including:

passing, by the VCM, selective ones of the second tier objects to the VSM of each second tier storage processor connected to the host system.

32. The method of claim 31, further including:

passing, by the VCM, selective ones of the second tier objects to a first tier processor connected to the host system and to a storage device storing a partition of the virtual volume data.

33. The method of claim 18, wherein assigning the second tier objects includes:

assigning a second tier object to a corresponding second tier storage processor based on whether the corresponding second tier processor is connected to the host system.

34. A method for accessing information in a system including at least one host system, storage devices, and first and second tier storage processors connected by a switching fabric, the method comprising:

identifying a first set of storage processors connected to the storage devices;

collecting from each storage device connected to a first set storage processor, one or more objects associated with a virtual volume corresponding to a first host system;

creating a logical tree of the virtual volume based on the collected objects, wherein the logical tree includes first tier objects reflecting partitions of the virtual volume data and second tier objects reflecting a logical configuration of the virtual volume;

assigning the first tier objects to selective ones of the first set storage processors; and assigning the second tier objects to a second set of storage processors that are each connected to the first host system corresponding to the virtual volume, wherein the first host system accesses data stored in the storage devices associated with the virtual volume through at least one of the second set storage processors.

35. A computer-readable medium including instructions for performing a method, when executed by at least one processor, for providing a virtual volume in a system including a host system, storage devices, and a network switch system having first and second tier storage processors, the method comprising:

identifying, for each storage device, any first tier storage processors connected to the respective storage device;

creating a logical tree reflecting a virtual volume of data distributed across the storage devices, wherein the logical tree includes (i) first tier objects representing partitions of the virtual volume data and (ii) second tier objects representing a logical configuration of the virtual volume;

assigning the first tier objects to selective ones of the first tier storage processors;

assigning the second tier objects to selective ones of the second tier storage processors; and managing the virtual volume using the first and second tier objects and storage processors.

36. A computer-readable medium including instructions for performing a method, when executed by at least one processor, for accessing information in a system including at least one host system, storage devices, and first and second tier storage processors connected by a switching fabric, the method comprising:

identifying a first set of storage processors connected to the storage devices;

collecting from each storage device connected to a first set storage processor, one or more objects associated with a virtual volume corresponding to a first host system;

creating a logical tree of the virtual volume based on the collected objects, wherein the logical tree includes first tier objects reflecting associations between the first set storage processors and the virtual volume and second tier objects reflecting a logical configuration of the virtual volume;

assigning the first tier objects to selective ones of the first set storage processors; and assigning the second tier objects to a second set of storage processors that are each connected to the first host system corresponding to the virtual volume, wherein the first host system may access data stored in the storage devices associated with the virtual volume through a second set storage processors.

37. A network switch system for providing a virtual volume in a storage virtualization environment including a host system, storage devices, wherein the network switch system includes first and second tier storage processors, the network switch comprising:

means for identifying, for each storage device, any first tier storage processors connected to the respective storage device;

means for creating a logical tree reflecting a virtual volume of data distributed across the storage devices, wherein the logical tree includes (i) first tier objects representing partitions of the virtual volume data and (ii) second tier objects representing a logical configuration of the virtual volume;

means for assigning the first tier objects to selective ones of the first tier storage processors;

means for assigning the second tier objects to selective ones of the second tier storage processors; and means for managing the virtual volume using the first and second tier objects and storage processors.

* * * * *